United States Patent [19]

Shimada

[11] Patent Number: 5,394,166
[45] Date of Patent: Feb. 28, 1995

[54] ELECTRONIC DEVICE

[75] Inventor: Kazutoshi Shimada, Kawasaki, Japan

[73] Assignee: Canon Kabushiki Kaisha, Tokyo, Japan

[21] Appl. No.: 92,938

[22] Filed: Jul. 19, 1993

Related U.S. Application Data

[63] Continuation of Ser. No. 755,330, Sep. 5, 1991, abandoned.

[30] Foreign Application Priority Data

Sep. 6, 1990 [JP] Japan ................ 2-234429
Dec. 20, 1990 [JP] Japan ................ 2-404332

[51] Int. Cl.⁶ .............................. G09G 3/36
[52] U.S. Cl. ..................... 345/98; 345/100; 345/131
[58] Field of Search ............ 340/731, 784, 717, 811, 340/814, 700, 720; 345/98, 100, 131

[56] References Cited

U.S. PATENT DOCUMENTS

| | | | |
|---|---|---|---|
| 4,589,029 | 5/1986 | Torimaru et al. | 340/731 X |
| 4,722,005 | 1/1988 | Ledenbach | 345/147 |
| 4,757,311 | 7/1988 | Nakamaru et al. | 340/731 |
| 4,896,148 | 1/1990 | Kurita | 340/731 |
| 4,952,932 | 8/1990 | Sugino et al. | 340/712 X |
| 4,990,902 | 2/1991 | Zenda | 340/771 X |
| 5,059,961 | 10/1991 | Cheng | 340/811 X |
| 5,078,476 | 1/1992 | Shin | 340/814 X |
| 5,093,870 | 3/1992 | Watanabe | 340/731 X |

FOREIGN PATENT DOCUMENTS 0300509 1/1989 European Pat. Off. .
4006271 8/1990 Germany .

OTHER PUBLICATIONS

E. L. Walker, Unified Read/Write Panel, IBM Technical Disclosure Bulletin, vol. 23, No. 1, pp. 278–281 (Jun. 1980).

Primary Examiner—Jeffery Brier
Attorney, Agent, or Firm—Fitzpatrick, Cella, Harper & Scinto

[57] ABSTRACT

In order to display the information useful for a user on a display screen at all times while saving the power for displaying, a CPU re-edits an image data stored in a VRAM into a ¼ screen and activates a display driver for the ¼ screen if the display of one frame of image has been completed. The CPU sets the values of a clock required to scan one line and one frame to a first register and a second register respectively. A load timing controller and a frame signal controller determine the size of screen displayed by the values set in the registers. Thus, there is provided a device on which appropriately edited data is displayed in a small screen.

22 Claims, 21 Drawing Sheets

FIG. 4A

| $a_{13}$ | $a_5$ | $a_6$ | $a_{14}$ |
|---|---|---|---|
| $a_7$ | $a_1$ | $a_2$ | $a_8$ |
| $a_9$ | $a_3$ | $a_4$ | $a_{10}$ |
| $a_{15}$ | $a_{11}$ | $a_{12}$ | $a_{16}$ |

FIG. 4B

| 1 | 2 | 2 | 1 |
|---|---|---|---|
| 2 | 4 | 4 | 2 |
| 2 | 4 | 4 | 2 |
| 1 | 2 | 2 | 1 |

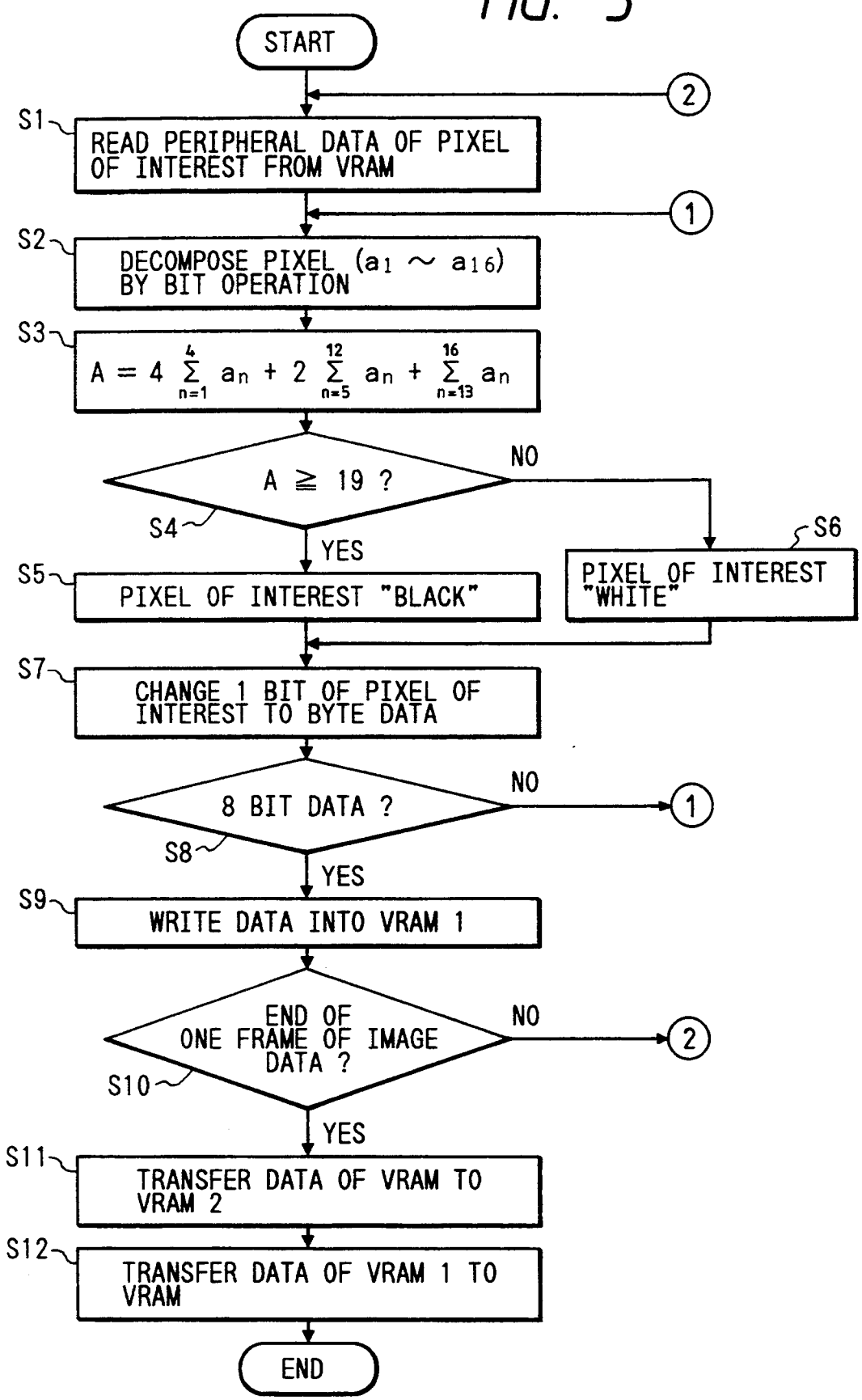

| AIUE COMMERCIAL FIRM | ☎ | 111-1111 |
|---|---|---|
| ALOHA (Inc.) | ☎ | 222-2222 |
| | ☎ | |
| | ☎ | |
| | ☎ | |
| | ☎ | |
| | ☎ | |

ELECTRONIC DEVICE

This application is a continuation of application Ser. No. 07/755,330, filed Sep. 5, 1991, now abandoned.

BACKGROUND OF THE INVENTION

1. Field of the Invention

The present invention relates to an electronic device, and more particularly to an electronic device having display means for representing a dot matrix.

2. Related Background Art

Conventionally, electronic devices such as a electronic notebook, a word processor or a personal computer using a liquid crystal or plasma display as display means are well known, in which so-called automatic power off control is often used where if there is no input such as an operational instruction for a predetermined time, the power supply is turned off for a display unit or the whole electronic device to save the power.

However, in the electronic devices as above described, when it is desired to think while watching the screen without input for a certain time, or watch the information displayed on the screen at times, it is very inconvenient that the screen disappears in a fixed time.

Also, in the type of automatically turning off the power of the whole device, the operation must be restarted from the beginning by turning on the power, which will take some labor and time.

On the other hand, in the type of stopping only the screen display, such a problem may not arise in that an original screen can be restored by the keyboard operation, but there was a disadvantage that a person except for the operator could not know the operation state of the device or the on/off state of power supply.

However, such a method may be very inconvenient when it is desired to think while watching the screen without input such as an operational instruction for a certain time, or watch the information displayed on the screen at times. Also, in the type of automatically turning off the power supply of the whole device, there is the disadvantage that to operate the device again after turning the power off, the operation from the power on to the display of necessary screen must be performed again. The device in which only the screen is turned off can restore the screen with the input from the keyboard, but there is a problem that the operation state of the device or the on/off state of power supply could not be known to a person except for the user, only by glancing at the screen, while the screen was being turned off.

SUMMARY OF THE INVENTION

It is an object of the present invention to provide a constitution of an electronic device which overcomes the previously mentioned problems and which allows the power-saving consistently with the visibility of display and the operativity of device by performing an appropriate display control.

To solve the previously-mentioned problems, the present invention adopts a constitution of an electronic device having display means for displaying a dot matrix, comprising means for variably controlling the number of lines or rows for actual use in driving the display of the dot matrix with the display means, and compression means of an image data, wherein a display area for actual use in driving the display with the display means is reduced in accordance with a predetermined control condition, and the image data compressed by the compression means is displayed in this reduced display area. With the above constitution, it is possible to reduce the display area for use in driving the display in accordance with a desired control condition, and to display compressed image data within this reduced display area.

In view of the conventional example as previously described, it another object of the present invention to save the consumption power for display of image while displaying the information required by the user at all times, without turning off the power of the device or the display screen completely.

To accomplish the above object, an electronic device of the present invention is constituted such that the electronic device having an image display unit comprises display means for displaying an image using a part of the display screen, edit means for picking up a characteristic portion from a displayed image and re-editing it on a reduced screen, and control means for controlling the switching between a screen display for reduced image edited by the edit means with the display means and a normal screen display using the entire display screen. With the above constitution, it is possible to put off unnecessary portions of the screen while leaving the minimum information required by the user on the screen.

It is another object of the present invention to provide an electronic device comprising,
storage means for storing the information to be displayed,
first control means for displaying the information stored in the storage means,
compression means for compressing the information stored in the storage means,
second control means for displaying the information compressed by the compression means, and
display means for displaying the information with the first control means or the second control means.

It is another object of the present invention to provide an electronic device comprising,
input means for inputting the information,
storage means for storing the information to be displayed which is input from the input means,
first control means for displaying the information stored in the storage means,
compression means for compressing the information stored in the storage means,
second control means for displaying the information compressed by the compression means, and
display means for displaying the formation with the first control means or the second control means if the input means is not operated for a predetermined period.

It is another object of the present invention to provide a display method including the steps of,
storing the information to be displayed in storage means,
a first control step of displaying the information stored in the storage means,
compressing the information stored in the storage means,
a second control displaying the information compressed by the compression means, and
displaying the information with the first control step or the second control step.

BRIEF DESCRIPTION OF THE DRAWINGS

FIG. 5 is a flowchart for the reduction and smoothing control.

FIGS. 12-2A and 12-2B are views exemplifying the display of an address screen.

FIGS. 12-3A and 12-3B are views exemplifying the display of an address screen.

FIGS. 12-4A and 12-4B are views exemplifying the display of a calendar screen.

FIGS. 12-5A and 12-5B are views exemplifying the display of a schedule screen.

FIGS. 13-1A and 13-1B are views exemplifying the display of a screen.

FIGS. 13-2A and 13-2B are views exemplifying the display of a screen.

DETAILED DESCRIPTION OF THE PREFERRED EMBODIMENTS

Figure 1:
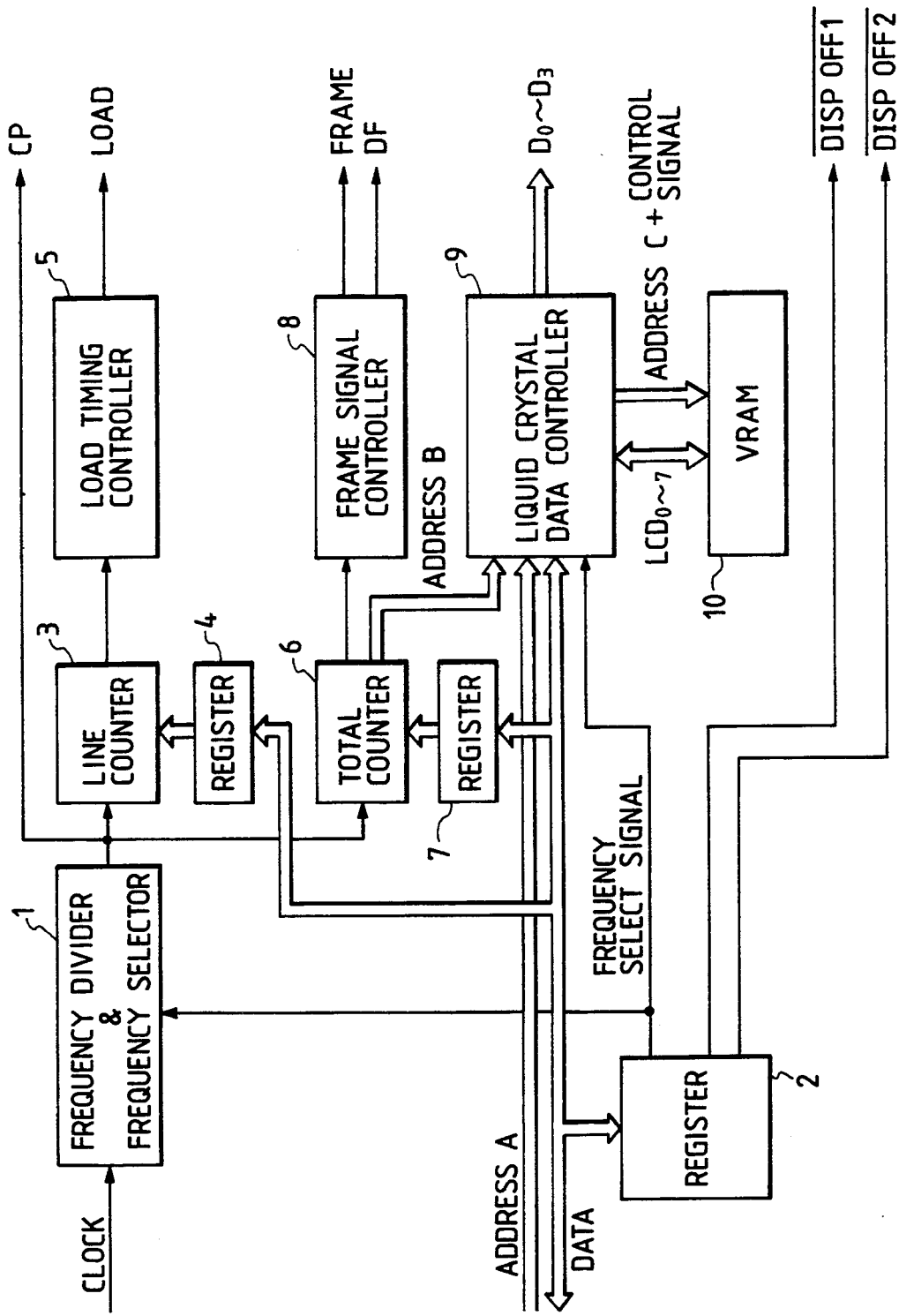
FIG. 1 is a block diagram of a liquid crystal controller for switching between the normal mode and the reduction mode.

The present invention will be described below based on the examples as shown in the drawings.

Figure 7:
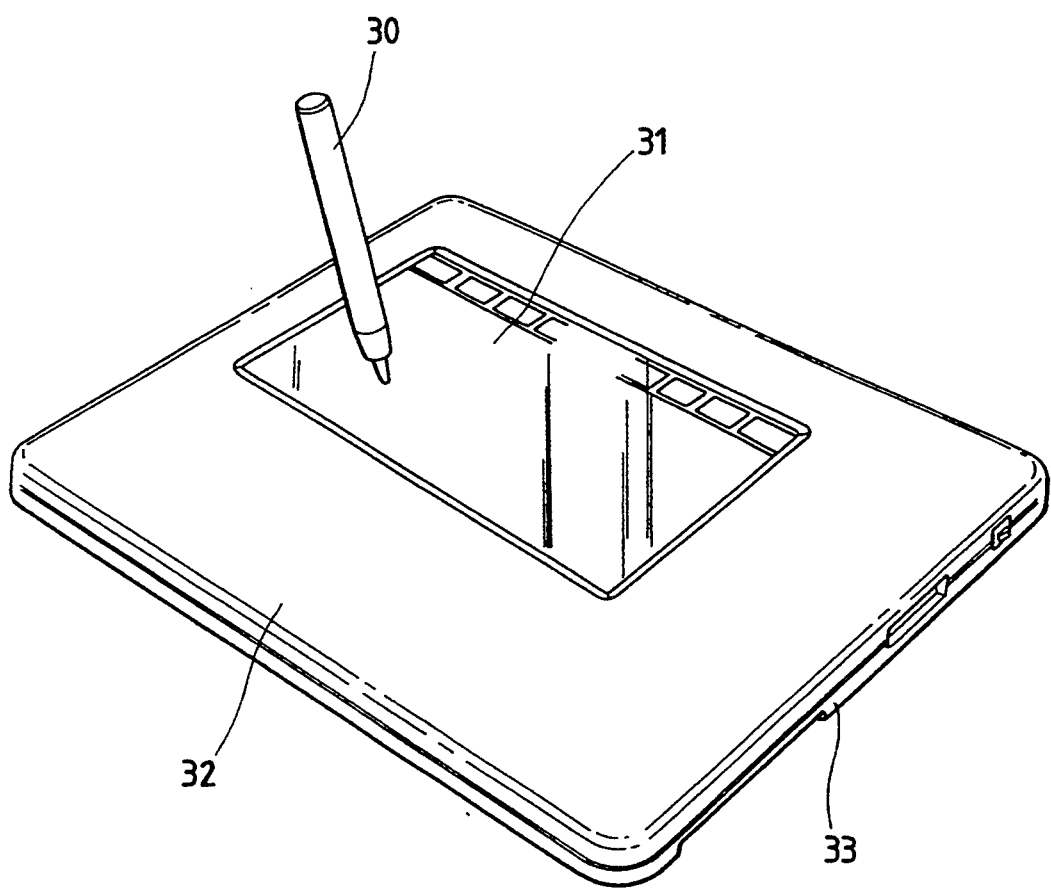
FIG. 7 is a perspective view showing the appearance of an electronic device.

An external view of a personal information device by the use of the present invention is shown in FIG. 7.

As shown in the figure, the personal information device of this example is one of inputting a character command on an input/output plane 31 in a combination of a transparent digitizer and a liquid crystal panel, with the handwriting by means of an input pen 30, and displaying a pen locus, a result of character recognition or a result of application.

Figure 8:
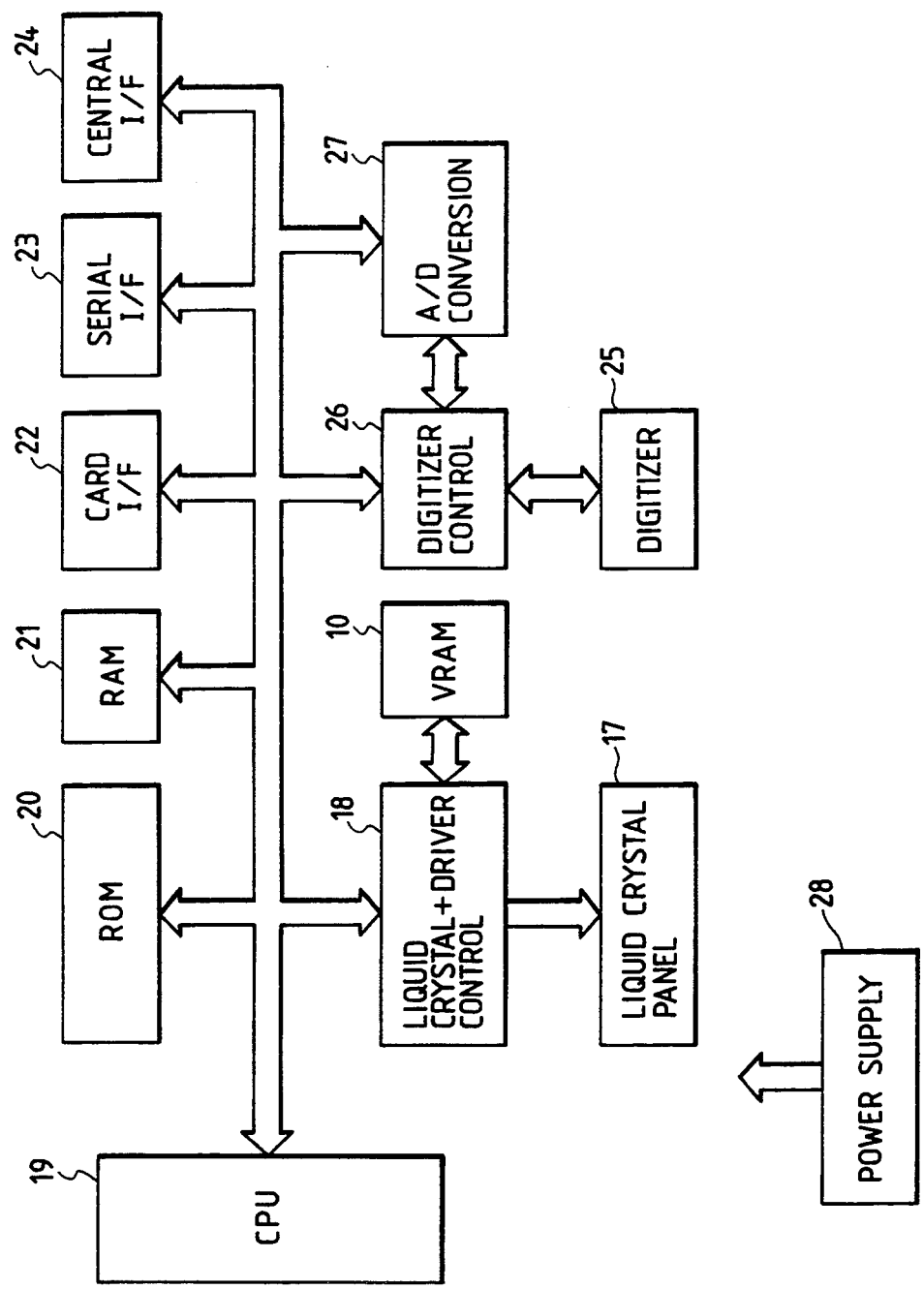
FIG. 8 is a block diagram for the entire control system in the electronic device.

A block diagram for the entire control system of the device of FIG. 7 is shown in FIG. 8.

The control system of FIG. 8 is to control the entire operation of the device with a CPU 19 having a microprocessor. A system bus of the CPU 19 is connected to each member as shown. In the following, each member will be described.

In a ROM 20 is stored a control program for the CPU 19 (and application programs, OS, and dictionary data, in addition to a procedure as shown in FIG. 5), while a RAM 21 is used for a work area of the CPU 19 or a RAM disk area.

Numerals 22 to 24 show interface circuits for an IC (memory) card as external storage means, a serial port such as RS232C, and a centronics port (i.e., a parallel port mainly for the printer), respectively.

An input/output plane 31 as shown in FIG. 7 is a combination of a transparent digitizer and a liquid crystal panel, which are indicated by numerals 25 and 17, respectively.

The display of the liquid crystal panel 17 is controlled via a liquid crystal controller/driver 18. The display data is stored in a VRAM 10. The transparent digitizer 25 is constituted of a digitizer of the resistive film method in which two sheets of glass (or one sheet of PET and the other of glass) with a resistive film deposited are opposed and the voltage at the time when two sheets of resistive film are contacted with the pressure of a pen is converted into a coordinate.

The input or output into or from the transparent digitizer 25 is controlled via a digitizer driver for obtaining the input coordinate with an input pen, and an A/D converter for converting the digitizer voltage into a digital value.

The power for the device is supplied from a power source unit 28 composed of a battery or a switching power source.

The application of such an information device (which is supplied by being stored in the ROM 20 or by the use of a medium such as an IC card) may be ①universal clock, ②schedule, ③address note, and ④character, calculation or drawing note.

FIG. 1 shows a constitution of the liquid crystal controller/driver 18 as shown in FIG. 7 for essential parts thereof.

A circuit of FIG. 1 reads display data from the VRAM 10 and transfers them to a driver (FIG. 3), as well as issuing a control signal, but this example is particularly provided with a reduction mode of reducing the display range of a display unit to decrease the transfer frequency of control signal and data, in addition to a normal mode.

Here, the liquid crystal panel 17 is a matrix liquid crystal of 320×128 dots, for example, with its display data being stored in the VRAM 10.

In the figure, numeral 1 is a frequency divider and frequency selector constituted of a counter and a selector, in which an input clock (e.g., 667 KHz) and a ¼ frequency-divided clock (e.g., 167 KHz) are selected by frequency select signal set in a register 2, and output as a line counter 3, a total counter 6 and a liquid crystal clock CP.

In the reduction mode of input clock, the clock having a quarter of the frequency in the normal mode is selected. The line counter 3 and the register 4 are to set the timing of a load signal LOAD, in which the setting is made so that the load signal is issued once for 80 clocks (320 dots) in the normal mode, or once for 40 clocks (160 dots) in the reduction mode.

Figure 3:
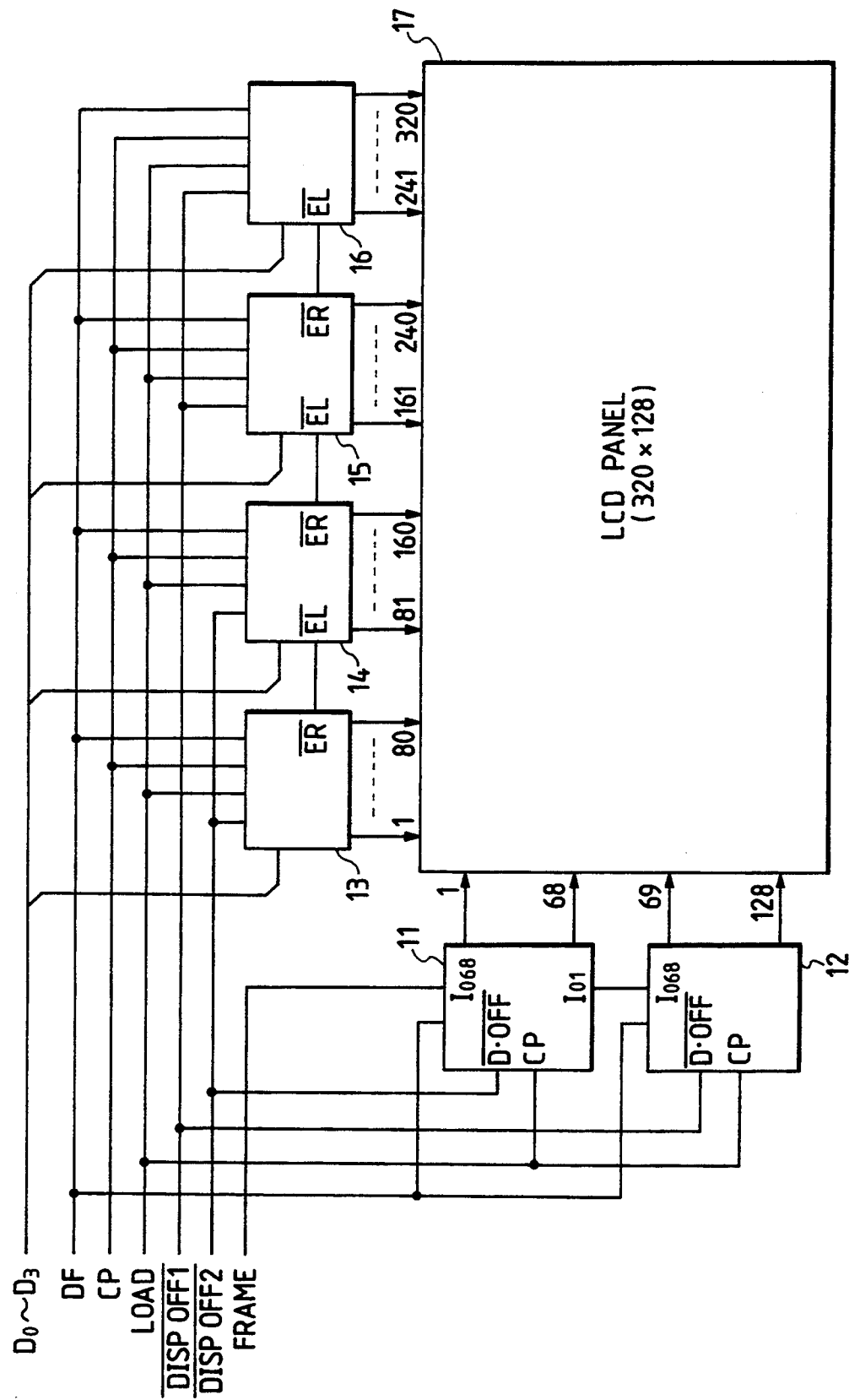
FIG. 3 is a block diagram for a liquid crystal display driver.

The setting value for the register 4 is written by the CPU. A load timing controller 5 adjusts the signal width from a count-up signal of the line counter 3, and outputs it as the load signal LOAD. The load signal LOAD is a signal for latching one line of data transmitted to the liquid crystal driver (FIG. 3).

A frame signal FRAME and an address B for VRAM data access are created by the total counter 6 and the register 7. As the liquid crystal screen has 320×128 dots in the normal mode of this example, the frame is generated one for every 128 lines. The number of counts for the register 7 is set by the CPU 19.

A frame signal controller 8 generates a signal DF for reversing the bias polarity of liquid crystal for each one frame, as well as outputting the frame signal FRAME at the timing when the total counter 6 counts up.

The number of counts in the total counter 6 directly becomes an address (address B) for accessing the VRAM 10.

An image data in the VRAM 10 is read and written through a liquid crystal data controller 9. When the CPU 19 reads or writes the content of the VRAM 10, the address A is selected, or when it reads the display content into the liquid crystal driver, the address B is selected, in which both timings are controlled not to overlap with each other.

As the data read from the VRAM 10 is 8 bits, and 4-bit data is transferred to the liquid crystal driver, read data is divided into upper and lower 4 bits which are sent out synchronously with the clock (CP).

The signals DISP OFF1 and DISP OFF2 set in the register 2 are control signals for turning the display of the liquid crystal driver into the OFF state (constant output voltage), in which in the normal mode, these signals DISP OFF1 and DISP OFF2 are turned into "H" in all the drivers, while in the reduction mode, only the DISP OFF1 which is connected to unused drivers is turned into "L".

Figure 2A:
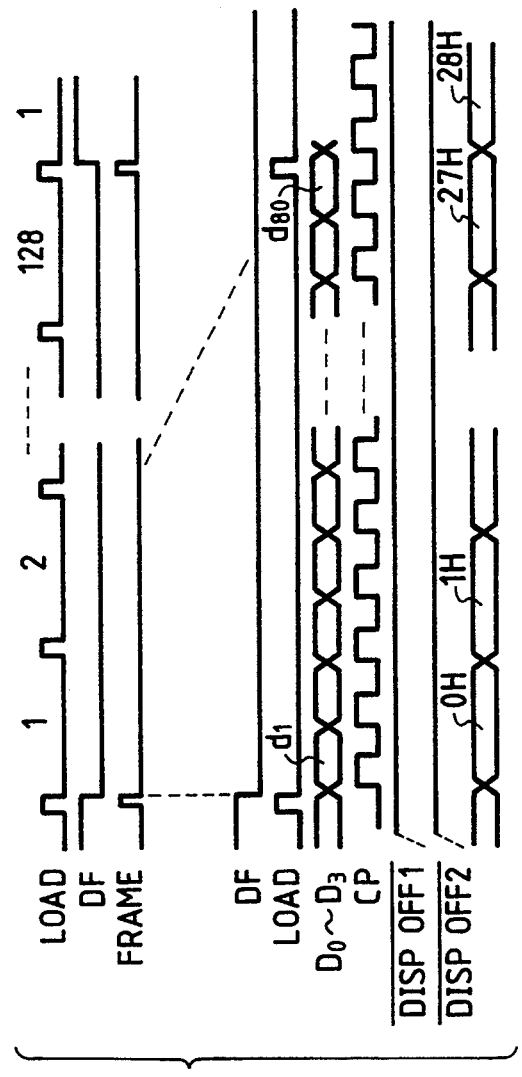
FIGS. 2A and 2B are timing charts in the normal mode and the reduction mode, respectively.
Figure 2B:
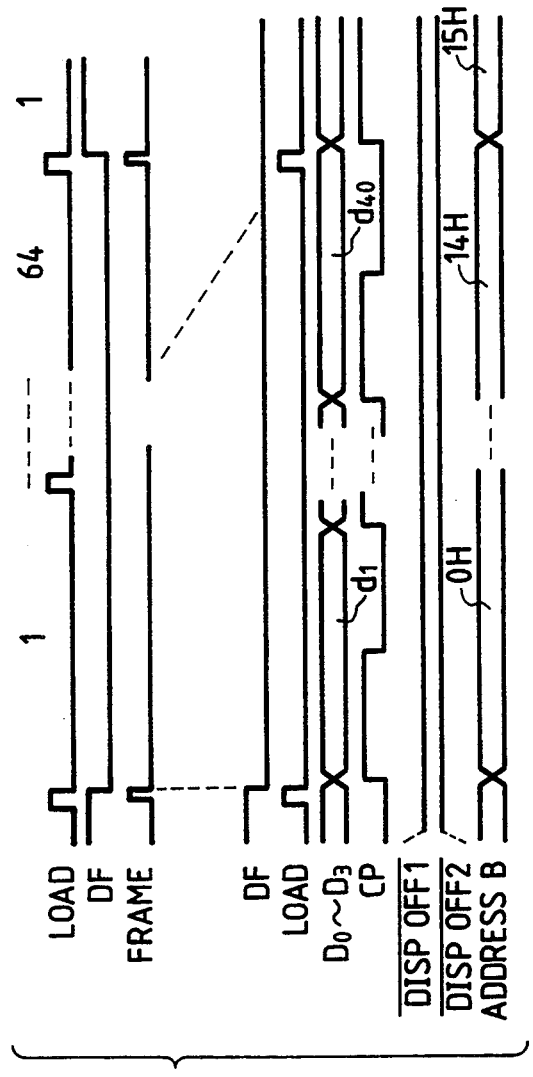

The timing waveforms of the operation as above described are shown in FIGS. 2A and 2B. FIG. 2A is in the normal mode, and FIG. 2B is in the reduction mode. The waveform is represented in one frame with the signals LOAD, DF and FRAME as shown in the upper portion, and in one line with the signals DF to address B as shown in the lower portion. In FIGS. 2A and 2B, the time width corresponding to one frame is the same.

FIG. 3 shows a drive circuit of liquid crystal panel 17. 11 and 12 are command drivers (e.g., MSM5298: Oki Electric Industry Co.), and 13, 14, 15 and 16 are segment drivers (e.g., MSM5299: Oki Electric Industry Co.). In the normal mode, all the drivers are used, while in the reduction mode, the drivers 11, 13, 14 are used.

Accordingly, the signal DISP OFF2 is connected to the drivers 11, 13, 14, and the signal DISP OFF1 is connected to the drivers 12, 15, 16.

Next, the reduction and smoothing of the display screen will be described with reference to FIGS. 4A and 4B. Each square as shown in FIGS. 4A and 4B indicates one display dot on the liquid crystal panel 17.

In the reduction of display image in this example, 4 dots are converted into one dot to reduce the screen by half, and the smoothing is performed to decrease the spatial frequency of image to decrease the apparent frequency for transfer of data.

Figures 1A, 12:
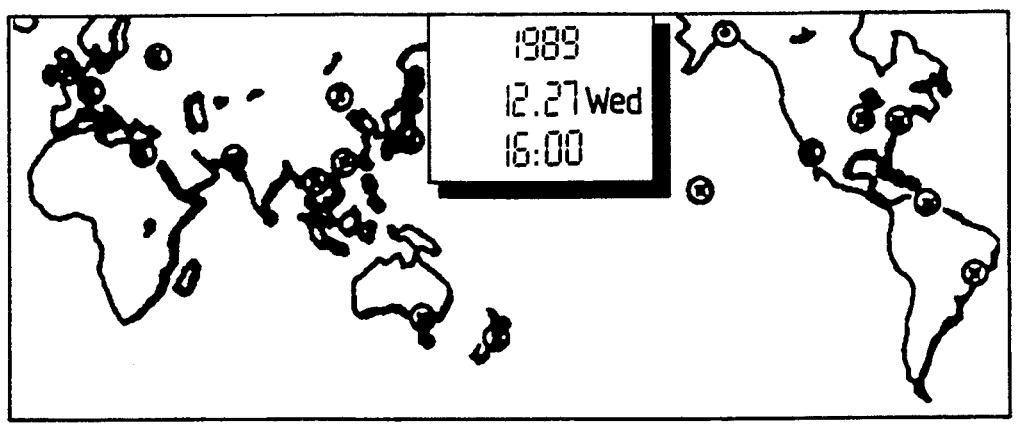
FIGS. 12-1A and 12-1B are views exemplifying the display of a universal clock screen.
Figures 1B, 12:
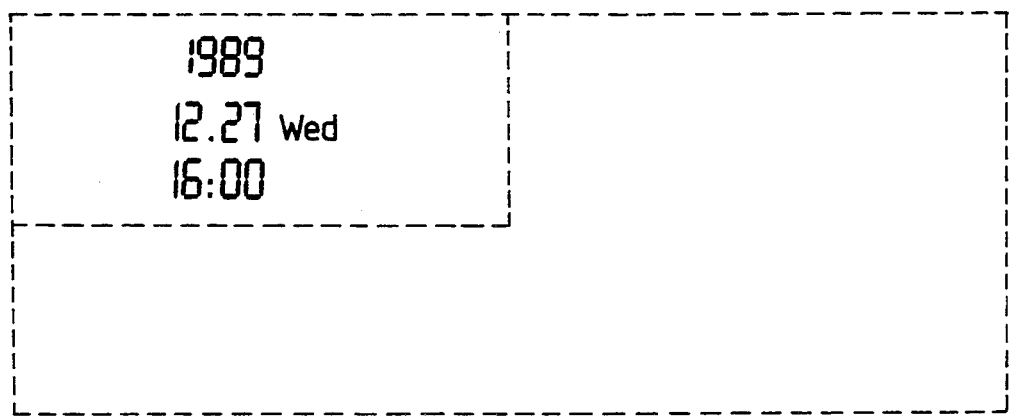
Figures 2A, 12:
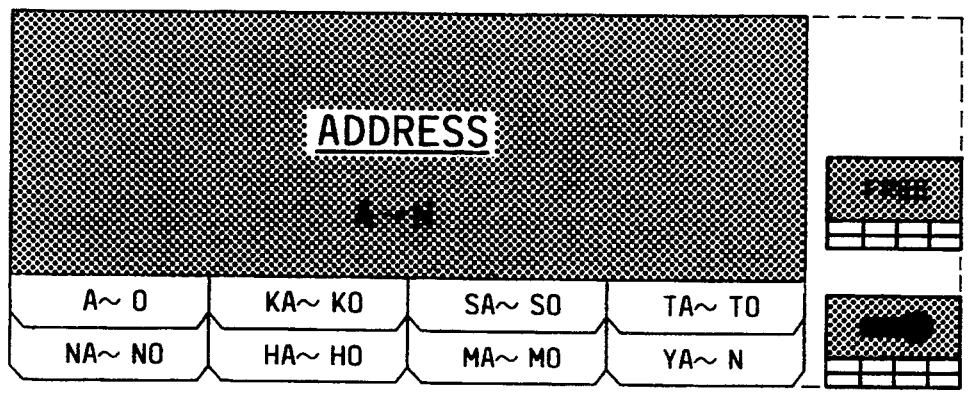
Figures 2B, 12:
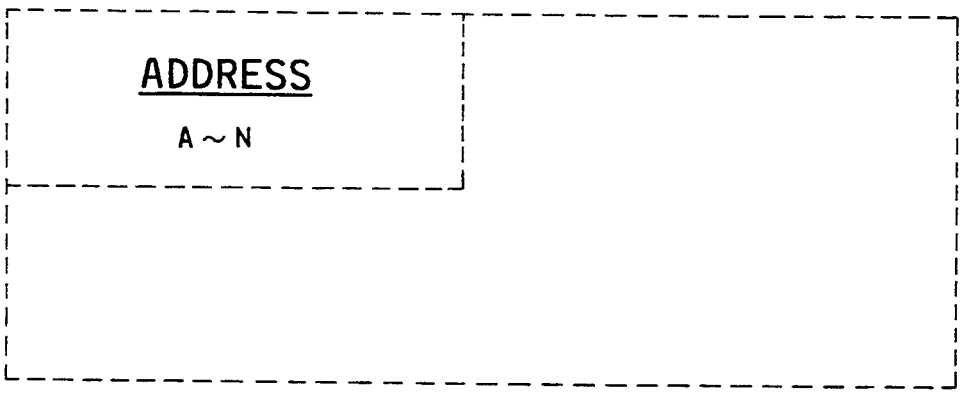
Figures 3A, 3B, 12:
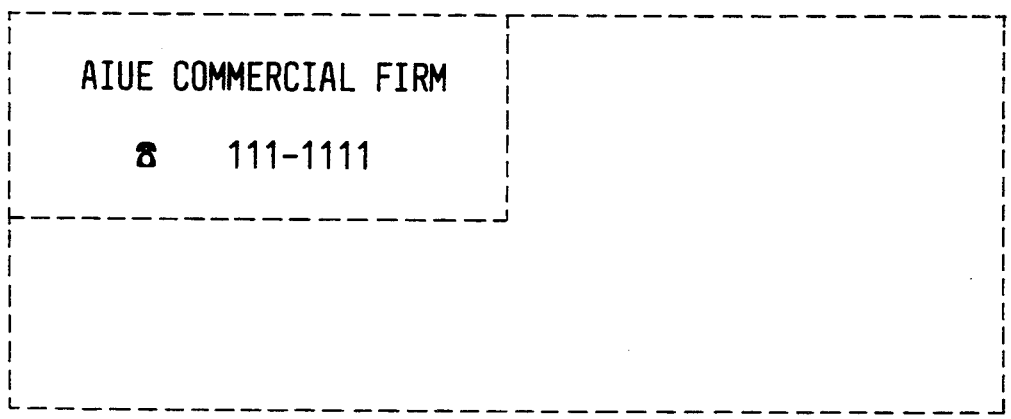
Figures 4A, 12:
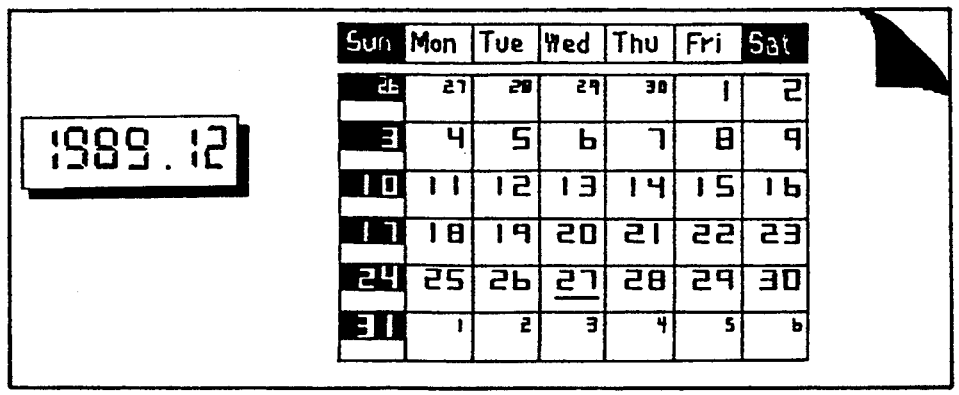
FIGS. 4A and 4B are explanation views for showing the weighting process in the reduction and smoothing control.
Figures 4B, 12:
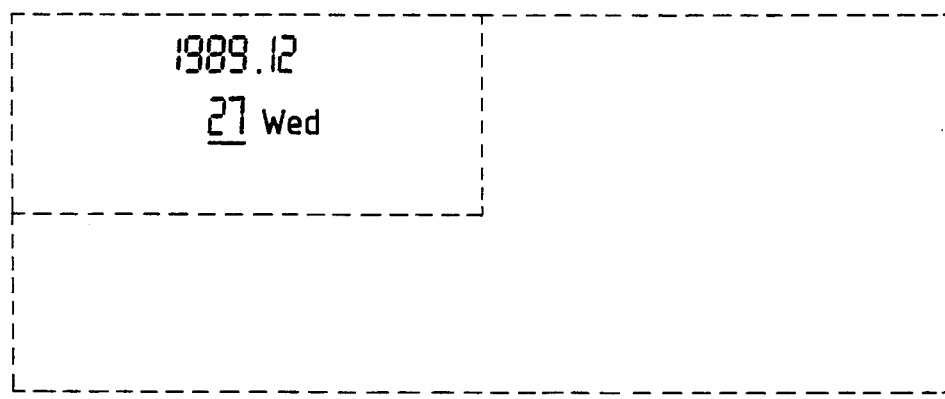

Thus, 12 dots of pixel ($a5$ to $a16$) around 4 dots of pixel of interest ($a1$ to $a4$) are picked up as shown in FIG. 4A, and the weight is given to each pixel as shown in FIG. 4B.

The pixel of interest is largest and the pixel is made smaller on the diagonal. If the value A obtained according to the following expression is $A \geq 19$, the dot for that pixel of interest is made "H", while if $A \geq 19$, it is made "L" ($A=36$ for all black pixels).

$$A = 4 \sum_{n=1}^{4} an + 2 \sum_{n=5}^{12} an + \sum_{n=13}^{16} an \quad (1)$$

Next, a control procedure for performing the reduction and smoothing of FIGS. 4A and 4B with software is shown in a flowchart as shown in FIG. 5. The procedure as shown is executed by the CPU 19. Note that in the procedure of FIG. 5, the area for display data is assigned to a region of the VRAM 10 or RAM 21 as VRAM1 and VRAM2.

At step S1 of FIG. 5, the pixel of interest and peripheral data are read from the VRAM 10 in which the information of currently displayed image is stored. As the 8-bit reduced image data is created at one time of reading, the data is constituted of a total of 16 bytes which are 4 bytes as the pixel of interest and 12 bytes as the peripheral pixel. Note that data at the end portion without image is made zero.

At step S2, the data read at step S1 is decomposed into bit data $a1$ to $a16$ for each pixel of interest, and at step S3, each pixel element ($a1$ to $a16$) is given the weight according to the expression (1) to calculate the value of A.

At step S4, it is determined whether the reduction and smoothing result for the pixel of interest is 1 or 0, depending on whether or not the calculated value A is greater than or equal to 19. At step S4, if A is greater than or equal to 19, the procedure proceeds to step S5, where the pixel of interest is set to 1 or "black", or if it is less than 19, the procedure proceeds to step S6, where the pixel of interest is set to 0 or "white".

And at step S7, one bit for the pixel of interest is converted into byte data sequentially in accordance with the image position.

At step S8, it is determined whether or not the data for the pixel of interest is calculated with 8 bits, and if not, the procedure returns to step S2 again, where the next pixel of interest is calculated in the same way. When calculated with 8 bits, the data is written into the VRAM1 which is a buffer for reduced data.

If the data conversion for one frame has not been completed at step S10, the procedure returns to step S1 again, where the next group of 16 bytes for the pixel of interest is read and the calculation is continued.

If one frame has been completed, data of the VRAM 10 is saved into the VRAM2, at step S11, and the data of the VRAM1 is transferred to the VRAM 10, at step S12. Thereby, the image displayed on the screen of the liquid crystal panel 17 can be reduced and smoothed.

Note that this mode is entered automatically when there is no input by the user for a predetermined period (e.g., five minutes) or if the mode is set by the user, although the subsequent flowchart is not shown.

And if there is any input by the user, the original image saved in the VRAM2 is immediately transferred to the VRAM to return to the normal screen mode. In the application where the display screen is required to change its value also in the reduced screen like the clock a time display portion is reduced and smoothed according to the algorithm as previously described, and written into the VRAM 10.

The reduction and smoothing process of display screen as above described can be executed, instead of the conventional automatic power off control, when it is confirmed that there is no input for a fixed period with a well-known method of measuring the time interval by an input pen 30, and in addition, can be performed in accordance with a user instruction with the input pen 30 or a switch operation, not shown.

If the display screen is represented in the reduction and smoothing, with the transfer frequency for display data and control signal decreased, and the display driver unit not contributing to the display turned off, the electric power for use in connection with the display can be greatly saved while the information required by the user always appears on the screen.

And the reduction is not simply performed by thinning out the dot, but along with the smoothing process, a high quality of image can be displayed without damaging the visibility of display and operability.

Also, in the conventional method in which the entire display is erased, there was a problem that the state of device could not be judged only by a visual inspection of device, but this example does not have such a problem.

Note that the input control and the time measurement other than the display can be also normally performed in the reduced screen.

Here, examples of the screen display in typical applications of the electronic device in this example are shown in FIGS. 6A to 6D.

Figure 6A:
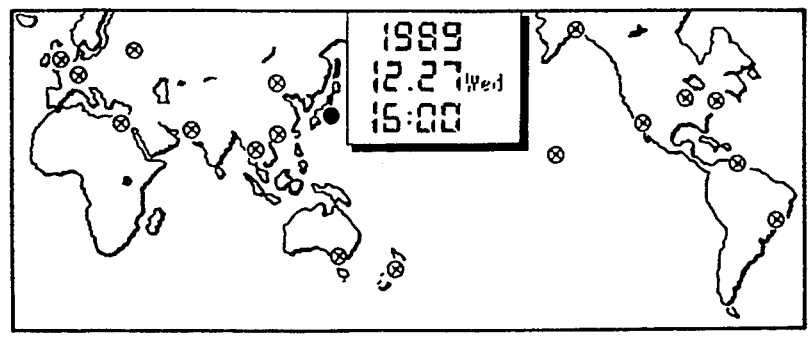
FIGS. 6A to 6D are explanation views for exemplifying the screen display.

The display of FIG. 6A is a universal clock, in which the year, month and day appearing in the central position indicates Japanese standard time. This is such an application that if each site in a world map is pointed to with a pen (with the display screen integral with a digitizer) or mouse, the standard time of each site is indicated.

Figure 6B:
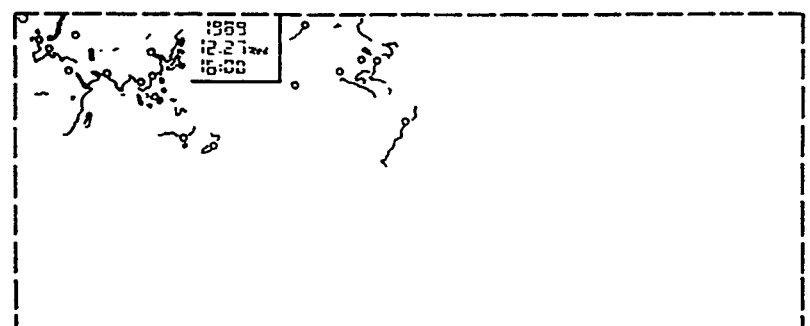
Figure 6C:
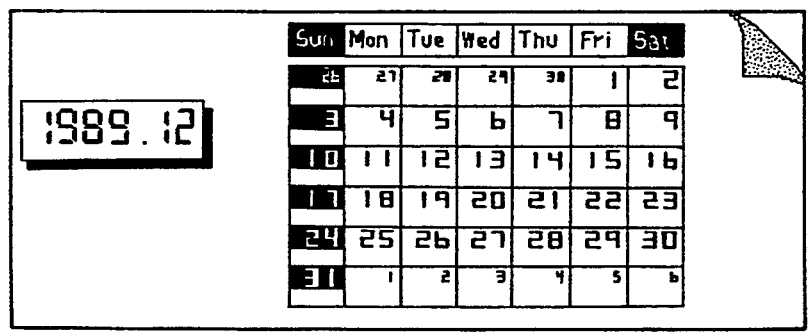

If the above-mentioned reduction and smoothing process is applied to the display of this application, the display reduced to ¼ in the area ratio can be obtained as shown in FIG. 6B.

The reduced image has a part of the map disappeared by the smoothing, but with the above-mentioned smoothing processing, the day and time can be read.

Figure 6D:
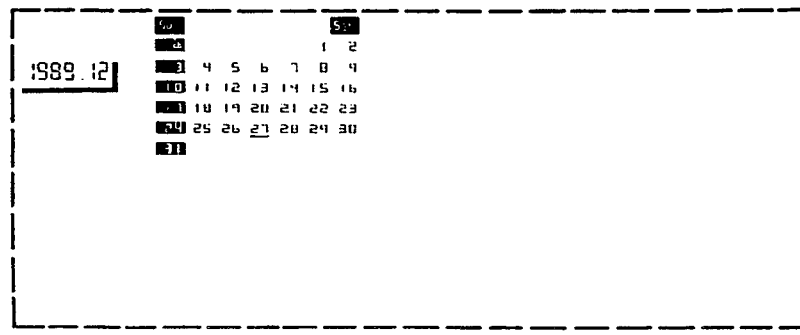

On the other hand, a calendar of FIG. 3 is an application in which the schedule for a specified day can be registered and confirmed by pointing to that specified data. With the above-mentioned smoothing process, the reduced screen has the ruled line and the day of week for the calendar disappeared, but the characters representing the day, or year and month can be read (FIG. 6D).

While in the above example, a simple matrix method was explained as the driving method by supposing the liquid crystal as the display element, an active matrix method using amorphous Si, polycrystalline Si or thin film transistor (TFT) will be described below as the driving method of the liquid crystal.

The active matrix method has one transistor for one pixel arranged on a substrate, and is also effective for the representation of a half tone.

Figure 9:
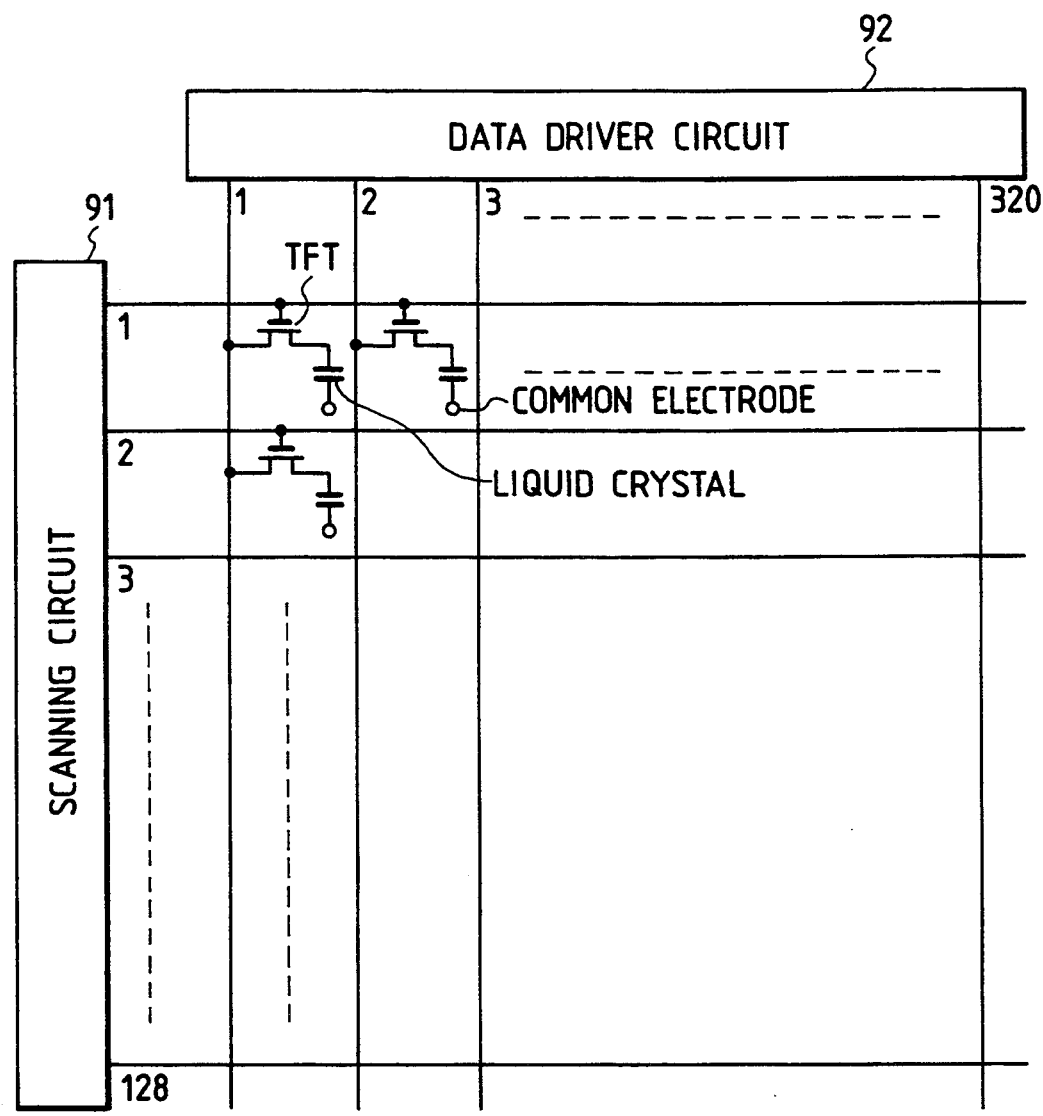
FIG. 9 is a block diagram showing a constitution using an active matrix liquid crystal.

As shown in FIG. 9, the matrix structure is constituted by a scanning circuit and a data driver circuit, in which in the reduction mode, as previously described, the scanning circuit 91 is changed from the scanning of terminals 1 to 80 of the active matrix to that of terminals 1 to 40, with the clock frequency made half, and further, the supply of display data via the data driver 92 is changed from the full use of terminals 1 to 320 to that of terminals 1 to 160, so that the reduced screen and the power-saving can be accomplished.

It is of course possible that other than the liquid crystal display, the same control can be made by using a simple matrix, EL (electronic luminescence) of active matrix or a plasma display.

Figure 10:
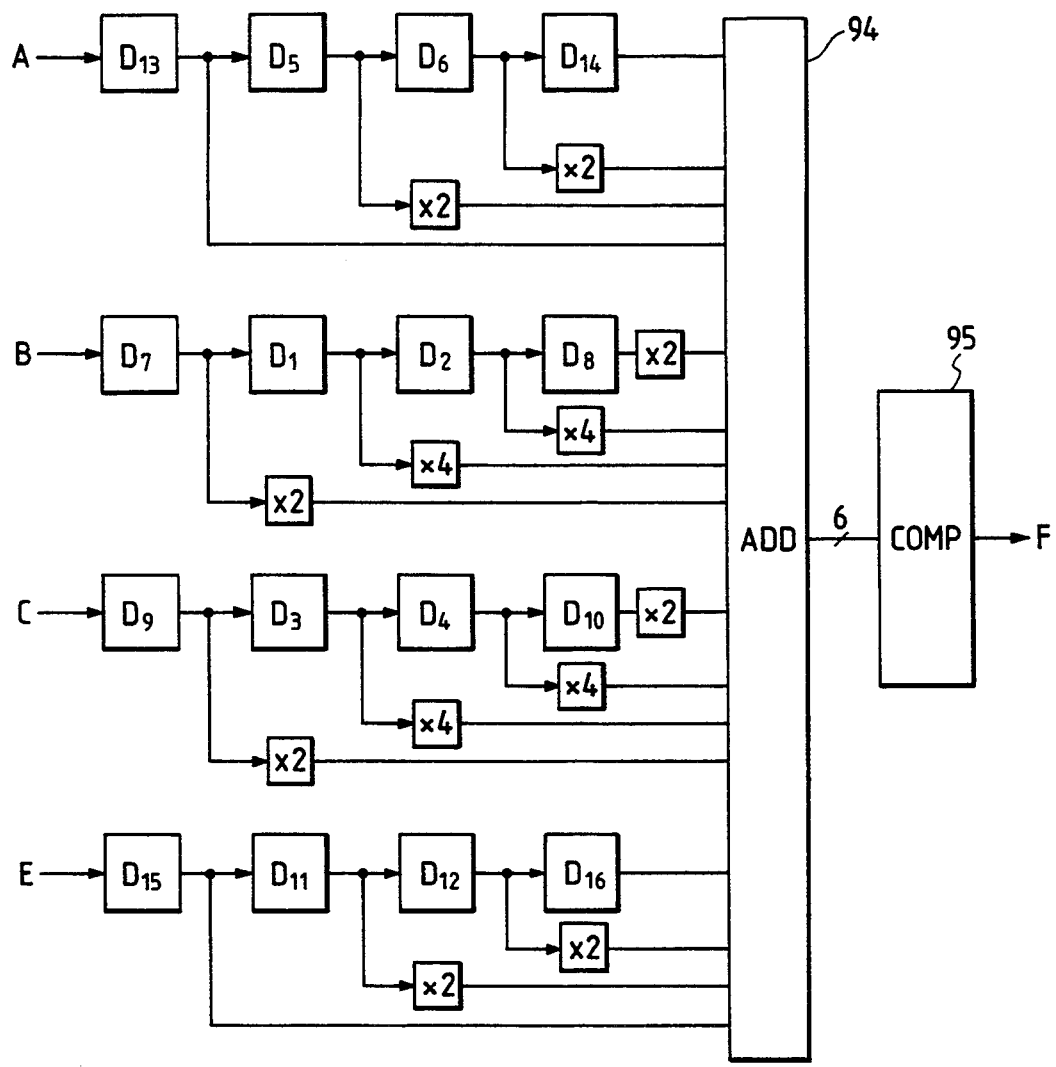
FIG. 10 is a block diagram for a reduction and smoothing hardware.

In the example as previously described, the compression and smoothing was made with the software based on the expression (1), but can be also made with the hardware. FIG. 10 shows one example of such a hardware configuration. A circuit of FIG. 10 performs mainly the weighting process as previously mentioned with the hardware.

In FIG. 10, numerals D1 to D16 are shift registers, in which pixel data input in 4-bit parallel into the terminals A to E are given the weights, respectively, and added in an adder circuit 94, and then it is determined by a comparator 95 whether or not an addition result is greater than or equal to 19, whereby an output data F of one byte can be obtained. If the data of A to E is shifted by 2 bits every time one bit is obtained, compressed data F of eight bits can be obtained.

The weighting is not limited to that as shown in FIGS. 4A and 4B, but it is of course possible that other coefficients can be adopted in accordance with a desired display control condition.

As will be clearly understood, according to the present invention, an electronic device having display means for displaying a dot matrix is constituted by comprising means for variably controlling the number of lines or rows for actual use in driving the display of the dot matrix with the display means, and compression means for an image data, in which the display area for actual use in driving the display with the display means is reduced in accordance with a predetermined control condition, and the image data compressed by the compression means is displayed in this reduced display area, whereby the display area for use in driving the display can be reduced in accordance with a desired control condition, and the compressed image data can be displayed within this reduced display area, so that there are excellent effects that the electric power necessary for the display can be saved and the display information necessary for the reduced display can be transferred to the user without deficiency.

Next, in another example, a personal information device for dealing with the personal information as shown in FIG. 7 is described. This personal information device has two kinds of display modes for the screen display, i.e., the normal mode and the reduction mode, in which in the reduction mode, a characteristic portion of the display in the normal mode is picked up and displayed in a quarter of the normal size (half vertically and half transversally). In this example the display member is a matrix liquid crystal of 320×128 dots as shown in FIG. 3.

FIG. 1 is an electrical block diagram of a display controller for explaining another example. The display controller reads the display data from a video RAM, and transfers its data to a display driver, together with the control signal. In addition, it performs the control for the reduction mode in which the display range is less than the normal display in the normal mode, and the transfer frequency of control signal and data is decreased.

In FIG. 1, 1 is a frequency divider and frequency selector constituted of a counter and a selector. This selects whether the input clock itself (e.g., 667 KHz) or the clock with its frequency divided by ¼ (e.g., 167 KHz) is to be used as the clock for the liquid crystal display, depending on the frequency select signal set on the register 2. The clock can be selected in accordance with the display mode. In the normal mode which provides a normal display, the input clock is directly used, while in the reduction mode with the area reduced to a quarter of that in the normal mode, the clock having the input clock frequency divided by ¼ is used. The clock is output to a line counter 3, a total counter 6 and a liquid crystal clock (CP), as thereafter described.

3 is the line counter for counting synchronously with the clock to get the timing at which the load signal (LOAD) is output. 4 is a register for giving the timing set value to the line counter 3 to set the timing at which the load signal is output, and 5 is a load timing controller for generating and outputting the load signal.

The load signal is input into the liquid crystal driver to latch the input data every time data corresponding to one line of the display matrix is passed to the liquid crystal driver. The liquid crystal driver concurrently receives 4 bits (4 dots) of data for each one clock. Therefore, the load signal is set to be output every time the data of one line of 320 bits has been transferred, i.e., once for every 80 clocks, in the normal mode, or the data of one line of 160 bits have been transferred, i.e., once for every 40 clocks, in the reduction mode.

To set the timing for outputting the load signal, the set value of the timing for outputting the load signal is written into the register 4 by the CPU 19 as will be described later. The line counter 3 reads that set value after the count is terminated, and restarts the count from zero. If the value of the line counter 3 reaches the set value that has been read, the line counter 3 outputs a count termination signal to terminate the count. The load signal is generated when the count termination signal is input into the load timing controller 5 and the signal width of the termination signal is adjusted.

6 is the total counter for counting synchronously with the clock to take the timing at which a frame signal (FRAME) is output, and 8 is a frame signal controller for generating and outputting the frame signal.

7 is a register for giving the timing set value to the total counter 6 to set the timing at which the frame signal is output, 9 is a liquid crystal data controller for controlling the liquid crystal based on the image data and the control data, 10 is a VRAM for storing the image data, and 19 is a CPU which controls the personal information device of the example.

The frame signal is a signal input into the liquid crystal driver every time the image data of one frame is passed to the liquid crystal driver. In this example, the display screen is composed of 320×128 dots in the normal mode, or 160×64 dots in the reduction mode, with which the frame signal is generated as one frame.

To set the timing for outputting the frame signal, the timing set value is written into the register by the CPU 19. The total counter 6 reads that set value after the count is terminated, and restarts the count from zero. If the value of the total counter 6 reaches the set value that has been read, the total counter 6 outputs a count termination signal to terminate the count. The count termination signal is input into the frame signal controller 8 and output as the frame signal.

The timing for outputting the frame signal is set in accordance with the display mode. The frame signal is output for every 1024 clocks in the normal mode because the frame is 320×128 dots, or for every 2560 dots in the reduction mode because the frame is 160×64 dots.

Also, the frame signal controller 8 also generates a signal (DF) for reversing the bias polarity of the liquid crystal for each one frame.

On the other hand, the value of the total counter 6 also serves as the address (address B) for accessing the VRAM 10 which stores the image data. The image data stored in the VRAM 10 is read and written through the liquid crystal data controller 9. The liquid crystal data controller 9 accesses the VRAM 10 by selecting the address A which is addressed by the CPU 19 when the CPU 19 reads and writes the content of the VRAM 10, or selecting the address B which is addressed by the total counter 6 when it reads the image data to be sent to the liquid crystal driver. In this way, the timings for both address A and address B are controlled not to be overlapped with each other.

Also, the image data read from the VRAM 10, which has one word of 8 bits, is output to the liquid crystal driver as the 4-bit data. Therefore, the liquid crystal data controller 9 divides the image data read from the VRAM 10 into upper 4 bits and lower 4 bits, which are sent to the liquid crystal driver synchronously with the clock (CP). Therefore, the least significant bit (LSB) of the address B is used as a select signal as to whether the upper 4 bits or the lower 4 bits is sent to the liquid crystal driver, and the value of the address B logically shifted one bit to the right is used as the address (address B') of the VRAM 10.

The DISP OFF1 signal and the DISP OFF2 signal set in the register 2 together with the frequency select signal are control signals for turning the display of the liquid crystal driver into the off state (constant output voltage) (in FIG. 1, both signals are represented in the negative logic). In the normal mode, the DISP OFF1 signal and the DISP OFF2 signal are both made "H", while in the reduction mode, only the DISP OFF1 signal is made "L". The DISP OFF1 signal is connected to only the driver not used in the reduction mode, as shown in FIGS. 4A and 4B.

Figure 11A:
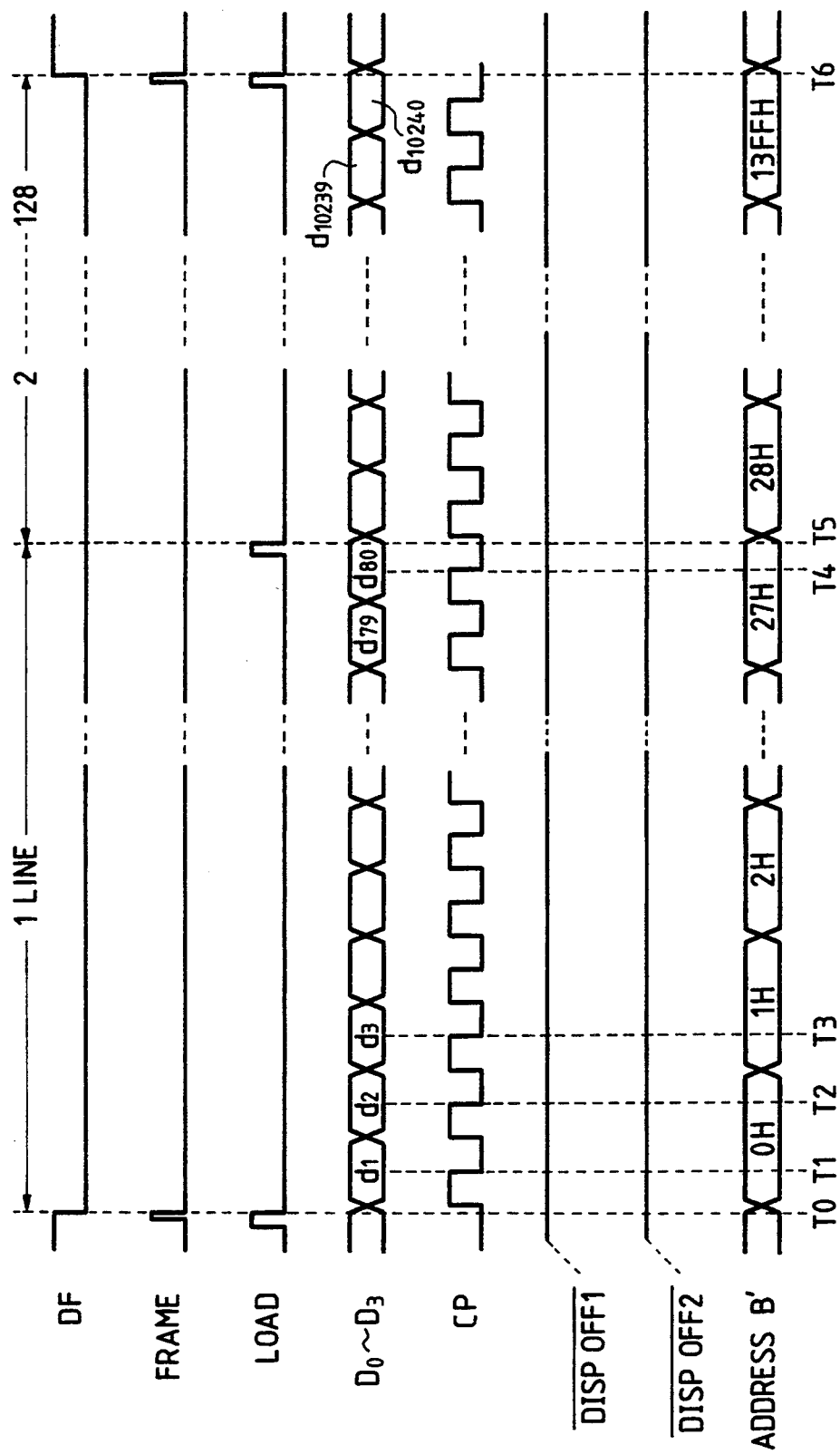
FIG. 11A is a timing chart for the display in the normal mode.
Figure 11B:
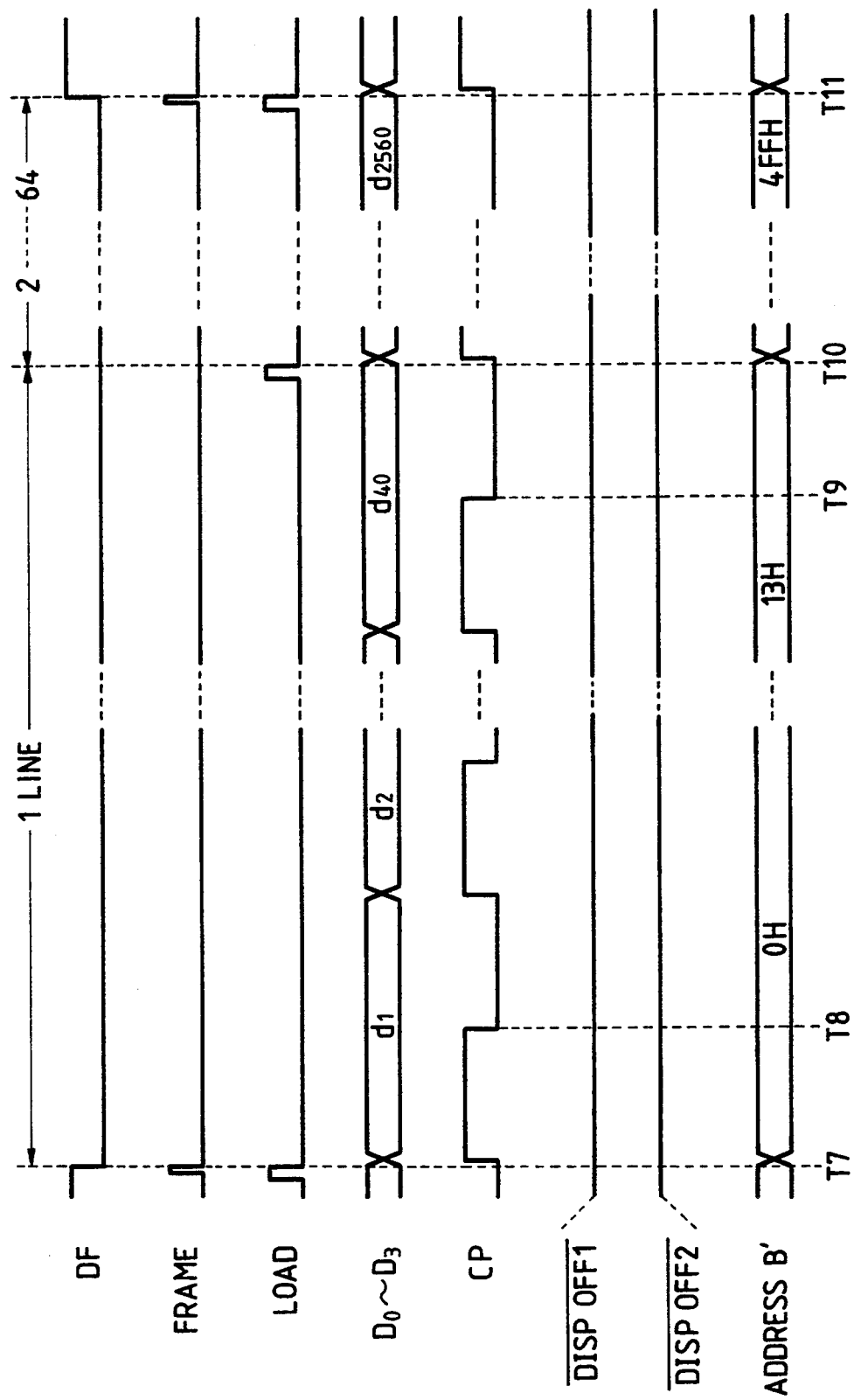
FIG. 11B is a timing chart for the display in the reduction mode.

The timing waveforms of the operation as above described are shown in FIGS. 11A and 11B. FIG. 11A shows the timing waveform in the normal mode, and FIG. 11B shows the timing waveform in the reduction mode.

In FIG. 11A, the timing T0 indicates the time when one frame of image data has been transferred and the frame signal is output. The display of a new frame is started from this timing.

The timing T1 is a timing when the first image data of the new frame is passed to the liquid crystal driver. The address B' points to a leading address of image data in the VRAM 10, in which if the leading data of 8 bits for the image data can be obtained, 4 bits of them are transferred to the liquid crystal driver.

At the timing T2, the value of the address B' is not changed from the value at the timing T1, so that the same memory location is accessed. Among one word of 8 bits of the data thus obtained, the remaining 4 bits, except for the 4 bits already transferred at the timing T1, are passed to the liquid crystal driver.

At the timing T3, the address B' is incremented to read the next memory location, 4 bits of which are passed to the liquid crystal driver. This is the same operation as at the timing T1 except for the value of the address B'.

The above operation is repeated until 320 bits (40 words) for one line of the display screen are passed to the liquid crystal driver.

At the timing T4, the last 4 bits among one line of data are passed to the driver. The transfer of data to the liquid crystal driver is made at the eightieth time from the start of transfer for one line of data (at the timing T1), with the address B' being 27 HEX indicating the fortieth word. The timing T5 is a timing for outputting the load signal. This terminates the transfer of one line of image data to the liquid crystal driver.

With the above operation, the transfer of image data for one line of 320 bits has been terminated. This is repeated for 128 lines of one frame.

The timing T6 is a timing when the transfer of image data for one frame has been terminated, and the frame signal is output. At this time, the display of one frame in the normal mode can be completed.

FIG. 11B is a timing chart for transferring the image data to the liquid crystal driver in the reduction mode. This is the same procedure as that in FIG. 11A, except for the number of bits constituting one line of the frame, and the number of lines constituting one frame.

The timing T7 is a timing when one frame of image data has been transferred and the frame signal is output. This terminates the display of one frame, and the display of a new frame is started from this timing.

The timing T8 is a timing when the first 4 bits of image data for the new frame is passed to the liquid crystal driver. The address B' points to a leading address of image data in the VRAM 10.

Then, as described in FIG. 11A, the image data is transferred to the liquid crystal driver sequentially each for 4 bits, which is repeated until 160 bits for one line of the frame in the reduction mode has been transferred.

The timing T9 is a timing when the last 4 bits among one line data of the frame are passed to the driver. The transfer of data to the liquid crystal driver is made at the fortieth time from the start of transfer of one line data, with the address B' being 13 HEX indicating the twentieth word.

As described in FIG. 11A, the transfer of image data to the liquid crystal driver is repeated by incrementing the value of the address B until one line data has been transferred.

At the timing T10, the data transfer for one line of the frame has been terminated, and the load signal is output.

With the above operation, the transfer of image data for one line of 160 bits has been terminated. This is repeated for 64 lines of one frame.

The timing T11 is a timing when the transfer of image data for one frame has been terminated, and the frame signal is output. At this time, the display of one frame in the reduction mode can be terminated.

By repeating the above procedure, the display in the normal or reduction mode can be made.

FIG. 3 shows the liquid crystal driver circuit. 11 and 12 are command drivers (e.g., MSM5298 made by Oki Electric Industry Co.), and 13, 14, 15 and 16 are segment drivers (e.g., MSM5299 made by Oki Electric Industry Co.). In the normal mode, all the drivers are used, while in the reduction mode, the drivers 11, 13, 14 are used.

Therefore, the signal DISP OFF2 is connected to each of the drivers 11, 13, 14, and the signal DISP OFF1 is connected to each of the drivers 12, 15, 16 in which if the signal DISP OFF1 signal is "L", the display will disappear except for a left upper quarter portion of the screen. 17 is a liquid crystal panel having a matrix constitution of 320×128 dots. An electronic device of this example is intended to deal with the personal information, in which there are provided the main functions of the universal clock, note screen, address and scheduler. FIGS. 12-1A, 12-1B, 12-2A, 12-2B, 12-3A, 12-3B, 12-4A, 12-4B, 12-5A and 12-5B show the examples of representing the above-mentioned functions except for the note screen.

Figures 5A, 12:
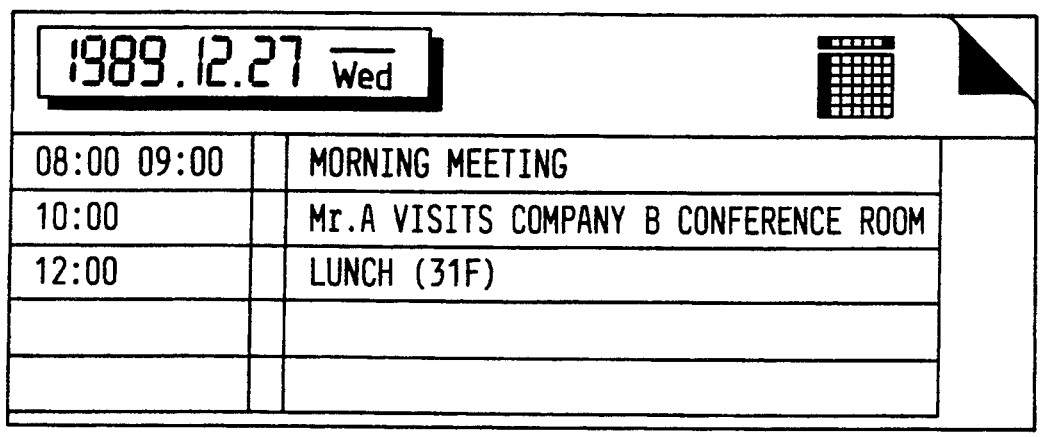
Figures 5B, 12:
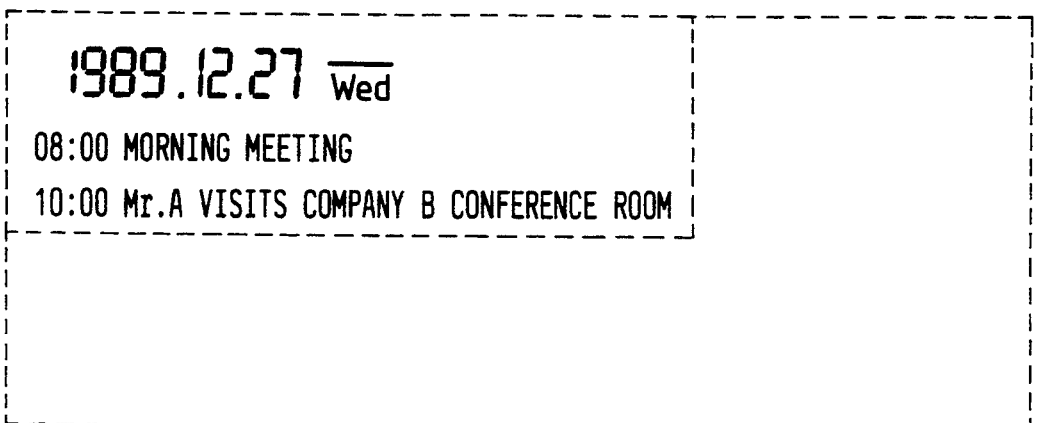

FIGS. 12-1A and 12-1B exemplifies the universal clock, FIGS. 12-2A and 12-2B the address (cover), FIGS. 12-3A and 12-3B the address (telephone list), FIGS. 12-4A and 12-4B the scheduler (calendar), and FIGS. 12-5A and 12-5B the scheduler (schedule for one day), in which (A) of each view represents the display in the normal mode, while (B) represents the display in the reduction mode, corresponding to (A). In the functions of the universal clock, address and scheduler, the information is written in the screen of fixed form, in which a portion to be picked up for the reduction mode can be predetermined as follows.

The universal clock allows the representation for the Japanese standard time, and the current day and time at the city on the world map by pointing to that city on the world map represented thereon. Thus, the Japanese standard time which is the most important information is displayed on the left upper quarter portion of the screen, as shown in FIG. 12-1B.

The address is to manage the addresses of persons or companies which can be entered in the order of the kana syllabary such as (ア - オ), (カ - コ), or in a free field which is not in the order of the kana syllabary. FIG. 12-2A which represents the address corresponds to the address index, with which the address in the ア column can be retrieved by pointing to (ア - オ). Thus, a title for the address function and an indication for the kana syllabary index are displayed as the most characteristic portion in the quarter portion of the screen, as shown in FIG. 12-2B.

FIG. 12-3A shows the telephone list for the ア column, the leading name of the ア column and its telephone number are displayed in the quarter portion of the screen as shown in FIG. 12-3B.

The scheduler is to manage the schedule of a person, in which the calendar screen is displayed in the normal mode as shown in FIG. 12-4A, while the year, month and day, and the day of week for today are displayed on the quarter portion of the screen as shown in FIG. 12-4B.

In the scheduler (schedule for one day) as shown in FIG. 12-5A, the start and end times for the schedule and its requirement are entered. Among them, the date and two schedules with the start time and the requirement (up to six characters), are displayed on the quarter portion of the screen as shown in FIG. 12-5B.

As above, each function of the universal clock, address and scheduler is displayed in a predefined form on the left upper quarter portion of the screen, in the reduction mode.

FIGS. 13-1A, 13-1B and FIGS. 13-2A, 13-2B show the examples of the note screen in which the character, calculation and drawing can be made freely in the screen, in the normal mode and the reduction mode.

Figures 1A, 13:
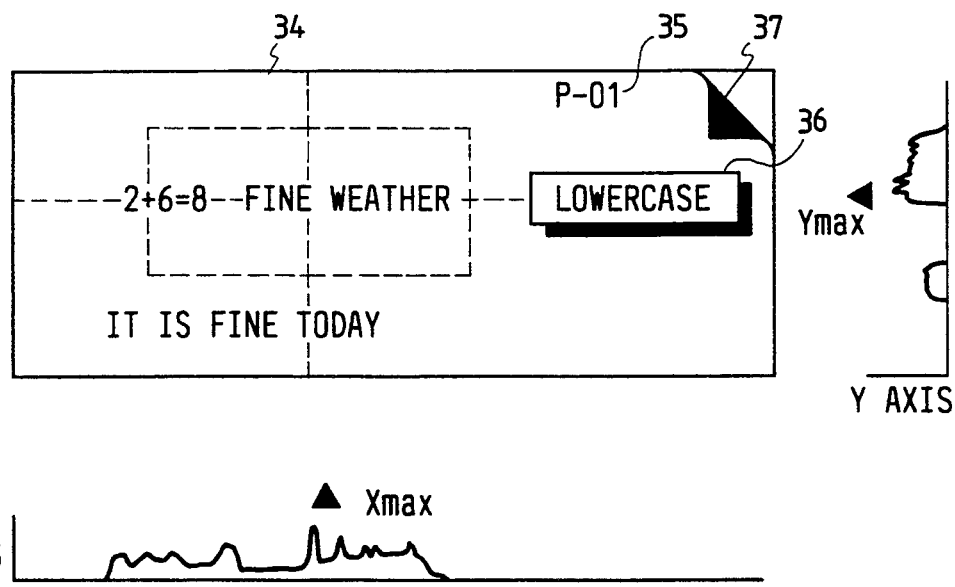
Figures 1B, 13:
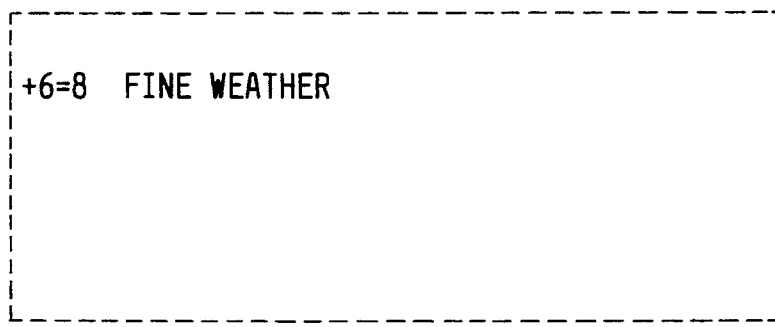
Figures 2A, 13:
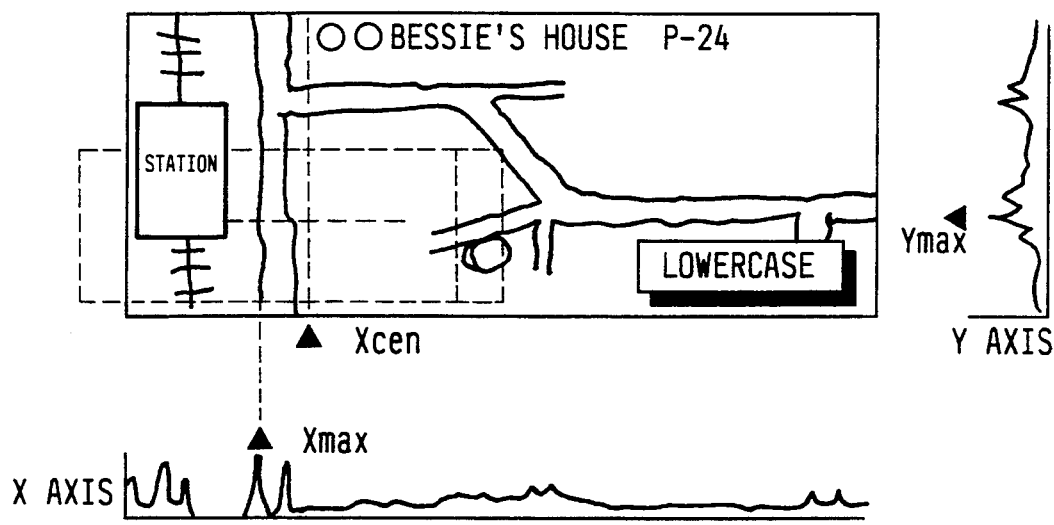
Figures 2B, 13:
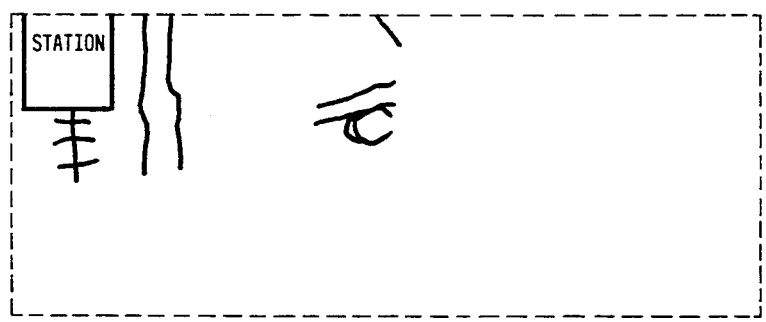

The note screen is a function of permitting the characters, numerical expressions and drawings to be freely written on the blank note. Therefore, the characteristic portion of the display is different for each page of the note, depending on the content to be written. Thus, as shown in FIGS. 13-1A and 13-2A, the number of image dots constituting a displayed image is counted for each line of dots, and the lines having maximum number are found in the longitudinal (Y-axis) direction and in the transverse (X-axis) direction, respectively. Around an intersection of dot lines in the longitudinal and transversal directions, a quarter of the display in the normal mode is picked up as the most characteristic portion, and moved to a left upper corner of the screen for the display in the reduction mode as shown in FIGS. 13-1B and 13-2B.

FIG. 13-2B can be obtained by moving a normal display image as shown in FIG. 13-1A left upward by the amount of a quarter screen, which is halved ($X_{max}$, $Y_{max}$) as the center, with $X_{max}$ being the line longitudinally and transversally, with an intersection having the greatest number of image dots in the longitudinal direction and $Y_{max}$ being the line having the greatest number of image dots in the transverse direction. In the figure, a frame line 34, a page number 35, a lowercase character switch 36 and a dog ear 37 for turning the page are not processed to count the image dot because they are not images drawn by the operator.

As the example of FIG. 13-2A, the frame of the quarter screen may extend out of the screen in the normal mode if the quarter screen is picked up with the center ($X_{max}$, $Y_{max}$) of the quarter screen being located toward the end portion. In this case, the pick-up center is moved to ($X_{cen}$, $Y_{max}$) in FIG. 13-2A to contain all the quarter frame in the screen, and the quarter frame is set anew. The screen of the reduction mode thus created is shown in FIG. 13-2B.

Figure 14:
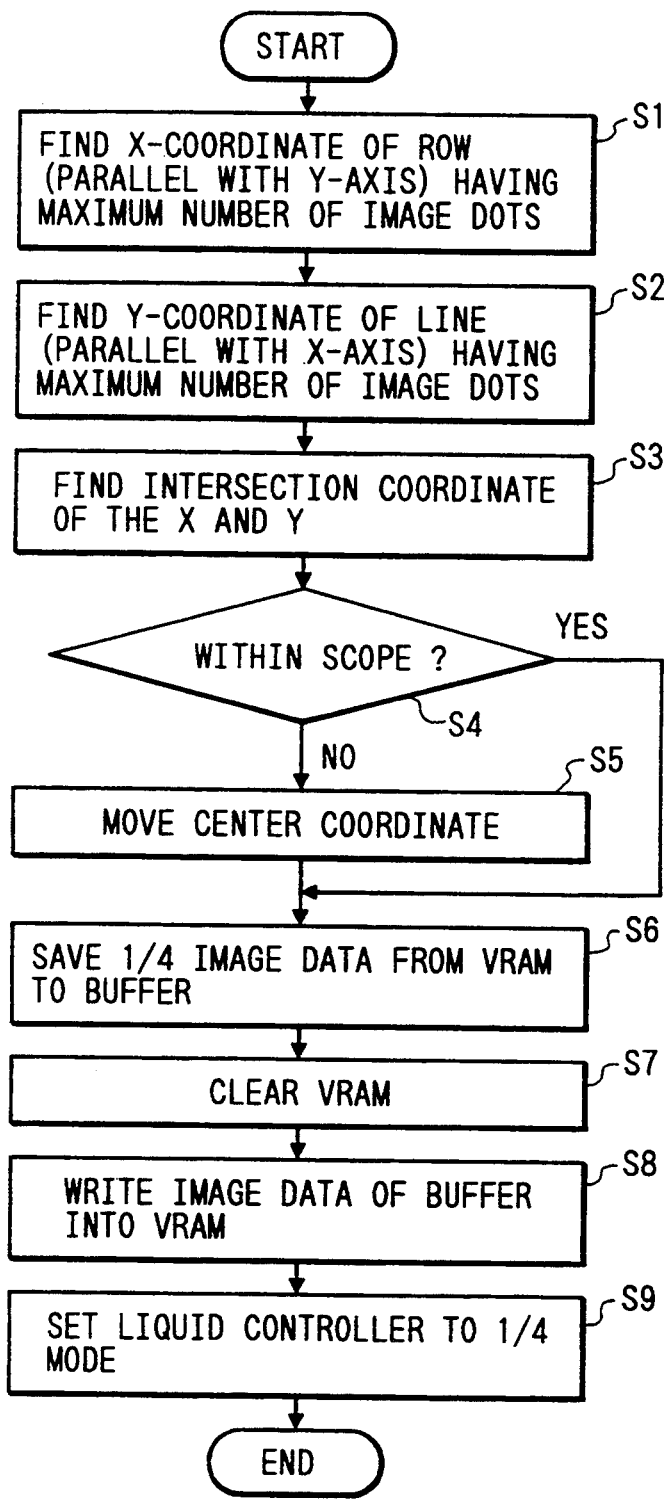
FIG. 14 is a flowchart for constituting a screen in the reduction mode.

A flowchart for the procedure of switching the note screen from the normal mode to the reduction mode, which is performed by the CPU 19 as above described, is shown in FIG. 14.

The transfer from the normal mode to the reduction mode takes place in either of the case in which there is no input beyond a fixed time, or there is an instruction from the operator. When switched to the reduction mode, it is first determined which function is currently used among the universal clock, address, scheduler and note screen, and then the screen is changed to each form screen, as shown in FIGS. 4A and 4B, except for the note screen. In the note screen, the processing is performed in accordance with the flowchart as shown in FIG.. 14.

At step S1, the X-coordinate of row having a maximum number of image dots is found by counting the number of image dots in a longitudinal (Y-axis) direction for all rows. At step S2, the Y-coordinate of line having a maximum number of image dots is found by counting the number of image dots in a transverse (X-axis) direction for all lines. From that coordinate as above obtained, the intersection coordinate is obtained at step S3. At step S4, it is determined whether a quarter of the normal screen picked up around that coordinate can be contained within the screen. If it is not contained, the center coordinate is moved so that the quarter frame can be contained within the screen, at step S5.

At step S6, the image data within the quarter frame determined at steps S3 and S5 among the image data stored in the VRAM 10 is once saved into the buffer. At step S7, the VRAM 10 is cleared, and at step S8, the image data saved in the buffer is rewritten into the VRAM 10 so as to be displayed on the left upper quarter portion of the display screen.

At step S9, the display control is set to the reduction mode by setting an appropriate value to the register 2 of FIG. 1.

Note that when there is any input again, or when there is an instruction from the operator, the mode is returned from the reduction mode of quarter screen to the normal mode of full screen.

In the example, the center of the reduced screen was set to the intersection between the line and the row having the greatest density of image dots, but it is also possible to determine the most characteristic screen (having the largest amount of data) by obtaining the maximum value in the extended region such as the addition of five or ten lines, rather than one line or row.

Finally, an external view of a personal information device having a display unit of this example is shown in FIG. 7, and an entire electrical block diagram is shown in FIG. 8.

As shown in FIG. 7, the personal information device of this example is one of inputting a character command on an input/output plane 31 in a combination of a transparent digitizer and a liquid crystal panel, with the handwriting by the use of an input pen 30, and displaying a pen locus, a result of character recognition, and a result of application.

In FIG. 8, VRAM 10 and a liquid crystal panel 17 are the same as those of FIG. 3. 18 is a unit consisting of a liquid crystal data controller (including peripheral circuits as shown in FIG. 1) and a liquid crystal driver, 19 is a 16-bit CPU for controlling this electronic device, 20 is a ROM (Read Only Memory) for storing a procedure as shown in FIG. 14, application programs, OS and dictionary data, 21 is a RAM (Random Access Memory) used for a RAM disk for storage of user data or a work area, 22 is an interface for an IC card, 23 is a serial interface such as RS232C, and 24 is a centronics interface for output to the printer, 25 is a digitizer with the resistive film method, in which two sheets of glass (or one sheet of PET and the other of glass) with a resistive film deposited are opposed and the voltage at the time when two sheets of resistive film are contacted with the pressure of a pen is converted into a coordinate at which the pressure is exerted. 26 is a digitizer driver for obtaining the XY coordinates from an output signal of the digitizer, 27 is an A/D converter for converting the digitizer voltage into a digital value, and 28 is a power source unit including a DC-DC converter.

The display member was described using a simple matrix dot liquid crystal, but an active matrix liquid crystal such as TFT, simple or active matrix EL, or a plasma display can be used likewise in this example.

Another example

In the previous example, when the reduction mode is entered because there is no input for a predetermined period or by a user instruction, the screen which appears has been edited with a predefined procedure of the electronic device.

Figure 15A:
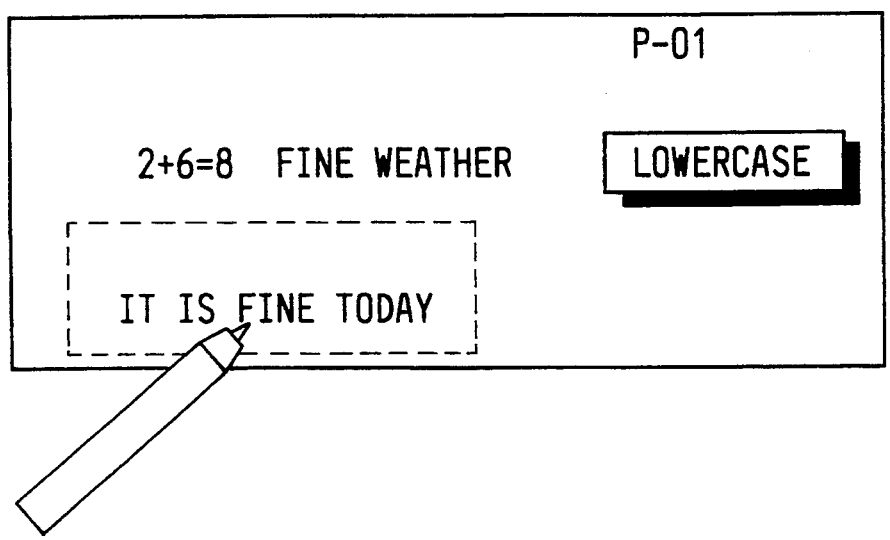
FIGS. 15A and 15B are views exemplifying the display of a screen with the user specification.
Figure 15B:
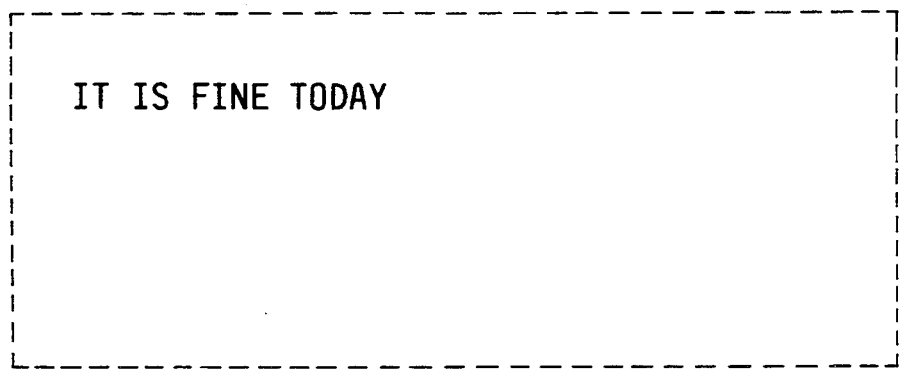

In this example, the note screen allows the selection of an image which the user himself desires to leave most. That is, when the reduction mode is desired, the "reduced screen mode" is selected by opening the menu and pointing to it with the pen 30, and further the "area specification" is selected from a sub menu. Then if any point on the note screen is pointed to, the frame of a quarter screen around a pointing spot is displayed superimposed on the screen. Then if the pen is moved while pressing thereon, the frame is moved along with its movement. The spot at which the pen is raised becomes a center coordinate, thereby transferring to the reduction mode. This is illustrated in FIGS. 15A and 15B. FIG. 15A shows how the quarter screen is obtained as a frame by pointing to the note screen in the normal mode with the pen. If separating the pen from the screen, a specified region is displayed on a left upper portion of the screen in the reduction mode, as shown in FIG. 15B.

Also, with the function having the format display, for example, the address (telephone list), the uppermost data in the telephone list was displayed in the reduction mode, whereas the quarter screen can be constructed to leave specified data on the screen in such a way as to select the "reduced screen mode" by opening the menu, select the "data selection" from the sub menu, and finally point to the telephone data which is desired to leave.

Likewise, the scheduler allows two necessary schedule data to be left on the reduced screen, rather than two schedules initially written. Also, in the universal clock, rather than the Japanese standard time, the standard time of a selected city can be left on the screen in the reduction mode.

As above described, there is an effect that the consumption power can be saved while displaying the information useful for the user at all times, without turning off the power of the device or erasing the display screen completely.

What is claimed is:

1. An electronic device having an image display unit, comprising:
   partial display means for activating only a part of a display screen and displaying an image on the activated portion of the display screen; and
   control means for controlling switching between a partial display by said partial display means and a normal display with a full display screen.

2. The electronic device according to claim 1, further comprising image edit means for picking up and re-editing a portion of an image normally displayed to create the image displayed with said partial display means.

3. The electronic device according to claim 1, wherein said control means decreases the frequency of data transfer clock.

4. An electronic device, comprising:
   display means for displaying a dot matrix image;
   means for variably controlling the number of lines or rows for actual use in driving the display of the dot matrix image on said display means, with a portion of said display means not being used to display the dot matrix image not being activated; and
   compression means for compressing image data, wherein
      the display area for actual use in driving the display with said display means is reduced in accordance with a predetermined control condition, and the image data compressed by said compression means is displayed in said reduced display area.

5. The electronic device according to claim 4, further comprising means for variably controlling a control clock frequency of said display means.

6. The electronic device according to claim 4, further comprising means for performing the smoothing of an image data as well as the compression of the image data in said reduced display area.

7. The electronic device according to claim 5, further comprising means for performing the smoothing of an image data as well as the compression of the image data in said display region at the reduction.

8. An electronic device, comprising:
   input means for inputting information to be displayed;
   storage means for storing information input from said input means;
   first control means for controlling the display of information stored in said storage means;
   compression means for compressing the information stored in said storage means;
   second control means for controlling the display of information compressed by said compression means;
   display means for displaying respective information controlled by said first control means or said second control means;
   a timer for timing a duration of a period during which there is no input from said input means; and
   means for displaying the information on said display means by switching from said first control means to said second control means when a value of the duration timed by said timer reaches a predetermined value.

9. The electronic device according to claim 8, wherein said second control means has means for compressing the information by giving respective weights to a plurality of pixels constituting the information.

10. The electronic device according to claim 8, wherein said second control means has means for activating a part of said display means and deactivating the remainder thereof.

11. The electronic device according to claim 8, further comprising means for displaying the information on said display means by switching between said first control means and said second control means.

12. An electronic device, comprising:
    input means for inputting information to be displayed;
    storage means for storing the information input from said input means;
    first control means for controlling the display of information stored in said storage means;
    compression means for compressing the information stored in said storage means;
    second control means for controlling the display of information compressed by said compression means; and
    display means for displaying the information controlled by said second control means if said input means is not operated for a predetermined period of time.

13. A method for displaying information, including the steps of:
    inputting information to be displayed;
    storing the input information in storage means;
    controlling the display of information stored in the storage means in a first control step;
    compressing the information stored in the storage means by compression means;
    controlling the display of information compressed by the compression means in a second control step;
    displaying respective information controlled in the first control step or in the second control step;
    timing a duration of a period of time during which no information is input in the input step; and
    displaying information by switching from the first control step to the second control step when a value of the duration timed in the timing step reaches a predetermined value.

14. An electronic device, comprising:
    input means for inputting information to be displayed;
    storage means for storing the information input from said input means;

first control means for controlling the display of information stored in said storage means;

designating means for designating a part of the information stored in said storage means;

second control means for controlling the display of part of the information designated by said designation means;

display means for displaying information controlled by said first control means or said second control means;

a timer for timing a duration of a period of time during which no information is input from said input means; and means for displaying the information on said display means by switching from said first control means to said second control means when a value of the duration timed by said timer reaches a predetermined value, wherein said second control means includes means for activating a part of said display means and de-activating the remainder thereof.

15. The electronic device according to claim 14, further comprising means for switching from the information being displayed by the control of said second control means to information to be displayed by the control of said first control means.

16. An electronic device, comprising:

storage means for storing information to be displayed;

a plurality of drive means for driving a display screen on the basis of the information;

drive control means for controlling said drive means;

switch means for switching between a first mode and a second mode; and mode control means for activating said plurality of drive means in the first mode, and for activating a part of said plurality of drive means and deactivating the remainder thereof in the second mode.

17. The electronic device according to claim 16, further comprising timer means for timing an interval between operations in the first mode, wherein said switch means switches from the first mode to the second mode after a predetermined time interval has passed.

18. The electronic device according to claim 16, further comprising edit means for editing the information to be displayed, and when the second mode is selected by said switch means, said drive control means controls said drive means on the basis of said edited information.

19. The electronic device according to claim 16, further comprising compression means for compressing the information, and when the second mode is selected by said switch means, said drive control means controls said drive means on the basis of said compressed information.

20. The electronic device according to claim 16, further comprising designation means for designating a part of the information, and when the second mode is selected by said designation means, said drive control means controls said drive means on the basis of said designated information.

21. A method for displaying information, comprising the steps of:

inputting information to be displayed;

storing the input information in storage means;

controlling the display of information stored in the storage means in a first control step;

designating a part of the information stored in the storage means;

controlling the display of part of the information designated in a second control step, said second control step including the step of activating a part of the information designated in the designating step and deactivating the remainder thereof;

displaying information controlled in the first control step or in the second control step;

timing the duration of time during which no information is input in the input step; and displaying the information by switching from the first control step to the second control step when the duration of time reaches a predetermined value.

22. The method according to claim 21, further comprising the step of switching from the displayed information controlled in the second control step to information controlled in the first control step to be displayed.

* * * * *

UNITED STATES PATENT AND TRADEMARK OFFICE
CERTIFICATE OF CORRECTION

PATENT NO. : 5,394,166
DATED : February 28, 1995
INVENTOR(S) : Shimada

It is certified that error appears in the above-indentified patent and that said Letters Patent is hereby corrected as shown below:

COLUMN 5:

Line 67, "$A \geq 19$," should read --$A<19$,--.

COLUMN 6:

Line 61, "clock" should read --clock,--.

COLUMN 13:

Line 11, "halved ($X_{max}$," should read --halved longitudinally and transversally, with an intersection ($X_{max}$,--.
Line 12, "longitudi-" should be deleted.
Line 13, "nally and transversally, with an intersection" should be deleted.

COLUMN 15:

Line 41, "data" should read --a data--.

Signed and Sealed this

Eighteenth Day of July, 1995

Attest:

BRUCE LEHMAN

Attesting Officer     Commissioner of Patents and Trademarks